(12) United States Patent
Cai et al.

(10) Patent No.: US 9,692,912 B2
(45) Date of Patent: Jun. 27, 2017

(54) CHARGING INFORMATION PROCESSING METHOD AND GATEWAY DEVICE

(71) Applicant: Huawei Technologies Co., Ltd., Shenzhen (CN)

(72) Inventors: Hui Cai, Shenzhen (CN); Shiyong Tan, Beijing (CN); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 99 days.

(21) Appl. No.: 14/582,498

(22) Filed: Dec. 24, 2014

(65) Prior Publication Data
US 2015/0111532 A1 Apr. 23, 2015

Related U.S. Application Data

(63) Continuation of application No. PCT/CN2012/077907, filed on Jun. 29, 2012.

(51) Int. Cl.
*H04M 11/00* (2006.01)
*H04M 15/00* (2006.01)
(Continued)

(52) U.S. Cl.
CPC ........ *H04M 15/67* (2013.01); *H04L 12/1425* (2013.01); *H04L 41/0654* (2013.01);
(Continued)

(58) Field of Classification Search
CPC .. H04W 4/24; H04L 12/1425; H04L 41/0654; H04M 15/41; H04M 15/43;
(Continued)

(56) References Cited

U.S. PATENT DOCUMENTS 5,781,855 A 7/1998 Reuhkala et al.
8,699,472 B2 * 4/2014 Faccinn ................. H04L 12/14
370/338
(Continued)

FOREIGN PATENT DOCUMENTS

CN 101296097 A 10/2008
CN 101764743 A 6/2010
(Continued)

OTHER PUBLICATIONS

"3rd Generation Partnership Project; Technical Specification Group Services and System Aspects; General Packet Radio Service (GPRS); Service Description; Stage 2 (Release 11)," 3GPP TS 23.060, V11.2.0, Jun. 2012, 335 pages.

*Primary Examiner* — Ajit Patel
(74) *Attorney, Agent, or Firm* — Slater Matsil, LLP

(57) ABSTRACT

Embodiments of the present invention provide a charging information processing method and a gateway device. The method includes sending, to a gateway forwarding plane, a charging information identification set used for identifying charging information, saving first charging information sent by the gateway forwarding plane, where the first charging information carries a first charging information identification, which is an element in the charging information identification set, receiving second charging information sent by the gateway forwarding plane and saved by the gateway forwarding plane, where the second charging information carries a second charging information identification, which is an element in the charging information identification set, and combining the first charging information and the second charging information according to the first charging information identification and the second charging information identification. In this way, a disaster recovery capability can be effectively improved and charging reliability can be ensured.

16 Claims, 12 Drawing Sheets

(51) Int. Cl.
*H04L 12/24* (2006.01)
*H04L 12/14* (2006.01)
*H04W 4/24* (2009.01)

(52) U.S. Cl.
CPC ........... *H04M 15/41* (2013.01); *H04M 15/43* (2013.01); *H04M 15/44* (2013.01); *H04M 15/62* (2013.01); *H04W 4/24* (2013.01); *H04M 15/73* (2013.01); *H04M 15/74* (2013.01)

(58) Field of Classification Search
CPC ...... H04M 15/44; H04M 15/62; H04M 15/73; H04M 15/67; H04M 15/74
See application file for complete search history.

(56) References Cited

U.S. PATENT DOCUMENTS 8,813,168 B2* 8/2014 Riley .................... H04M 15/00
707/694

| | | | | |
|---|---|---|---|---|
| 2002/0068545 A1* | 6/2002 | Oyama | ............... | G06Q 30/0601 455/406 |
| 2004/0167834 A1 | 8/2004 | Koskinen et al. | | |
| 2008/0010179 A1 | 1/2008 | Cai et al. | | |
| 2008/0101570 A1* | 5/2008 | Cai | ........ | H04M 15/00 379/115.01 |
| 2008/0181378 A1* | 7/2008 | Cai | ........ | H04M 15/00 379/121.01 |
| 2009/0264097 A1* | 10/2009 | Cai | ........ | G06Q 30/04 455/406 |
| 2012/0117220 A1* | 5/2012 | Mariblanca Nieves | .................... | H04L 12/14 709/223 |
| 2012/0142311 A1* | 6/2012 | Rui | .................... | H04L 12/1407 455/406 |

FOREIGN PATENT DOCUMENTS

| | | |
|---|---|---|
| CN | 102045175 A | 5/2011 |
| WO | 2011047568 A1 | 4/2011 |
| WO | 2011072613 A1 | 6/2011 |

* cited by examiner

CHARGING INFORMATION PROCESSING METHOD AND GATEWAY DEVICE

This application is a continuation of International Application No. PCT/CN2012/077907, filed on Jun. 29, 2012, which is hereby incorporated by reference in its entirety.

TECHNICAL FIELD

Embodiments of the present invention relate to the field of communications technologies, and in particular, to a charging information processing method and a gateway device.

BACKGROUND

The $3^{rd}$ Generation Partnership Project (3GPP) standardization develops a brand new evolved network, and system architecture evolution (SAE) of the evolved network is shown in FIG. 1. In SAE architecture, after a user equipment (UE) accesses an evolved universal terrestrial radio access network (E-UTRAN) through a radio air interface, the UE first attaches to a mobility management entity (MME). The MME acquires user subscription data and authentication information from a home subscriber server (HSS), and initiates a process of performing authentication on the UE. After the MME completes the authentication process, the UE or the MME initiates a process of establishing a bearer used for transmitting user data. In the process, the MME notifies a serving gateway (S-GW) to establish, for a user, a bearer that is from the E-UTRAN to a packet data network gateway (P-GW) and is used for transmitting user data, where a notification message carries an address of the P-GW and address information of an E-UTRAN network element where the user resides. The P-GW forwards downlink data from an external packet data network (PDN) to the UE through the bearer, and forwards uplink data from the UE to a corresponding PDN.

To be compatible with the existing universal terrestrial radio access network (UTRAN) and global system for mobile communications/enhanced data rates for GSM evolution radio access network (GSM/EDGE radio access network) (GERAN), the UE may access the MME through the UTRAN or GERAN and a serving general packet radio service (GPRS) support node (SGSN), and may establish a GPRS tunnel protocol (GTP) tunnel connection with the S-GW through the UTRAN/GERAN and the SGSN. The S-GW converts a GTP tunnel into a corresponding bearer that connects to the P-GW and is used for transmitting user data. The UTRAN may also establish a GTP tunnel that directly connects to the S-GW. The MME serves as a network element that processes only control plane signaling, and the S-GW and the P-GW are mainly responsible for forwarding user plane data. The S-GW and the P-GW may be combined into one network element, and may be referred to as a unified gateway (UGW).

With the development of mobile Internet services, enrichment of enterprise network services, and integration of mobile access networks of multiple RATs, a gateway device needs to be gradually developed toward more refined service control and charging based on implementation of a basic data forwarding function, so as to support more abundant service implementation and control demands from an operator. Meanwhile, in an evolved network, a UGW still needs to maintain a large number of external signaling interfaces. These signaling interfaces include a GTP control plane (GTP-C) bearer interface between an MME and a gateway, a policy and charging control (PCC) interface between a policy and charging rules function (PCRF) and the gateway, a charging interface between a charging system and the gateway, a lawful interception interface between a lawful interception device and the gateway, a dynamic host configuration protocol (DHCP) interface between a DHCP server and the gateway, an interface between an authentication, authorization and accounting (AAA) server and the gateway, and the like.

In order to process a large amount of interface signaling, a large amount of hardware such as a general computing processor chip is added to the gateway on the basis of a dedicated hardware platform, so that a hardware platform of the gateway device is quite complex and has an excessively high cost, which is adverse to the promotion and deployment of mobile packet data networks.

To solve the foregoing problem, a scenario where a control plane and a forwarding plane of the gateway are separated emerges currently, that is, the gateway is divided according to functions into a gateway control plane (GW-C) and a gateway forwarding plane (GW-U), and an interface between the GW-C and the GW-U is defined as Sg. In a charging process, the GW-C implements user access, policy control and charging bill management and the GW-U is mainly responsible for forwarding data and executing control and a first charging policy delivered by the control plane. However, when a communication failure occurs to the Sg interface, the GW-U cannot send collected charging information through the Sg interface to the GW-C to generate a charging bill, thereby causing that the charging information is lost.

SUMMARY

Embodiments of the present invention provide a charging information processing method and a gateway device, so that a disaster recovery capability of a system can be improved and charging reliability can be ensured.

In a first aspect, a charging information processing method is provided and includes sending, to a gateway forwarding plane, a charging information identification set used for identifying charging information. The method further includes saving first charging information sent by the gateway forwarding plane, where the first charging information carries a first charging information identification, and the first charging information identification is an element in the charging information identification set, and receiving second charging information sent by the gateway forwarding plane and saved by the gateway forwarding plane, where the second charging information carries a second charging information identification, and the second charging information identification is an element in the charging information identification set. The method further includes combining the first charging information and the second charging information according to the first charging information identification and the second charging information identification.

In a first possible implementation manner, combining the first charging information and the second charging information according to the first charging information identification and the second charging information identification may be specifically implemented by combining the first charging information and the second charging information according to correspondence between the first charging information identification and the second charging information identification.

In combination with the first aspect or the first possible implementation manner of the first aspect, in a second possible implementation manner, saving the first charging information sent by the gateway forwarding plane may be specifically implemented as follows. When it is detected that a failure occurs to a link to the gateway forwarding plane, the first charging information is saved. Receiving the second charging information sent by the gateway forwarding plane and saved by the gateway forwarding plane may be specifically implemented as follows. When it is detected that the link to the gateway forwarding plane is recovered, the second charging information sent by the gateway forwarding plane and saved by the gateway forwarding plane is received.

In combination with the first aspect or the first possible implementation manner of the first aspect, in a third possible implementation manner, the saving the first charging information sent by the gateway forwarding plane may be specifically implemented by sending a first message to the gateway forwarding plane, and saving the first charging information at the same time, where the first message is used for instructing the gateway forwarding plane to save the second charging information.

According to the third possible implementation manner, in a fourth possible implementation manner, before the receiving the second charging information sent by the gateway forwarding plane and saved by the gateway forwarding plane, the method may be specifically implemented by sending a second message to the gateway forwarding plane, where the second message is used for instructing the gateway forwarding plane to send the second charging information.

In combination with the first aspect or the first possible implementation manner or the second possible implementation manner or the third possible implementation manner or the fourth possible implementation manner of the first aspect, in a fifth possible implementation manner, combining the first charging information and the second charging information according to the first charging information identification and the second charging information identification may be specifically implemented as follows. If the first charging information and the second charging information are successfully combined, a charging bill is generated. If the first charging information and the second charging information fail to be combined, that the charging information is lost is recorded, or a request message is sent to the gateway forwarding plane, where the request message includes the first charging information identification, so that the gateway forwarding plane searches, according to the request message, for third charging information matching with the first charging information.

According to the fifth possible implementation manner, in a sixth possible implementation manner, sending the request message to the gateway forwarding plane, where the request message includes the first charging information identification, so that the gateway forwarding plane searches, according to the request message, for the third charging information matching with the first charging information may be specifically implemented as follows. If the gateway forwarding plane finds the third charging information, the third charging information sent by the gateway forwarding plane is received, where the third charging information carries a third charging information identification, and the third charging information identification is an element in the charging information identification set, and the first charging information and the third charging information are combined according to the first charging information identification and the third charging information identification. If the gateway forwarding plane does not find the third charging information, a third message sent by the gateway forwarding plane is received, where the third message is used for indicating that the charging information is lost.

In combination with the first aspect or the first possible implementation manner or the second possible implementation manner or the third possible implementation manner or the fourth possible implementation manner or the fifth possible implementation manner or the sixth possible implementation manner of the first aspect, in a seventh possible implementation manner, the method may be specifically implemented as follows. An element in the charging information identification set includes one of or any combination of the following: a value generated by a gateway control plane, a user equipment identification (UE ID), a terminal address UE IP, a UE entry index, and a context index.

In a second aspect, a charging information processing method is provided and includes receiving a charging information identification set sent by a gateway control plane and used for identifying charging information, and sending first charging information to the gateway control plane, where the first charging information carries a first charging information identification, and the first charging information identification is an element in the charging information identification set. The method further includes saving second charging information, and sending the second charging information to the gateway control plane, where the second charging information carries a second charging information identification, and the second charging information identification is an element in the charging information identification set, so that the gateway control plane combines the first charging information and the second charging information according to the first charging information identification and the second charging information identification.

In a first possible implementation manner, saving the second charging information may be specifically implemented as follows. When it is detected that a failure occurs to a link to the gateway control plane, the second charging information is saved. Sending the second charging information to the gateway control plane may be specifically implemented by, when it is detected that the link to the gateway control plane is recovered, sending the second charging information to the gateway control plane.

In a second possible implementation manner, before saving the second charging information, the method may be specifically implemented by receiving a first message sent by the gateway control plane. Saving the second charging information may be specifically implemented by saving the second charging information according to the first message.

According to the second possible implementation manner, in a third possible implementation manner, after saving the second charging information according to the first message, the method may be specifically implemented by receiving a second message sent by the gateway control plane. Sending the second charging information to the gateway control plane may be specifically implemented by sending the second charging information to the gateway control plane according to the second message.

In combination with the second aspect or the first possible implementation manner or the second possible implementation manner or the third possible implementation manner of the second aspect, in a fourth possible implementation manner, the method may be specifically implemented by receiving a request message sent by the gateway control plane, where the request message includes the first charging information identification, and searching, according to the request message, for third charging information matching with the first charging information.

According to the fourth possible implementation manner, in a fifth possible implementation manner, searching, according to the request message, for the third charging information matching with the first charging information may be specifically implemented as follows. If the third charging information is found, the third charging information is sent to the gateway control plane, where the third charging information carries a third charging information identification, and the third charging information identification is an element in the charging information identification set, so that the gateway control plane combines the first charging information and the third charging information according to the first charging information identification and the third charging information identification. If the third charging information is not found, a third message is sent to the gateway control plane, where the third message is used for indicating that the charging information is lost.

In combination with the second aspect or the first possible implementation manner or the second possible implementation manner or the third possible implementation manner or the fourth possible implementation manner or the fifth possible implementation manner of the second aspect, in a sixth possible implementation manner, the method may be specifically implemented as follows. An element in the charging information identification set includes one of or any combination of the following: a value generated by the gateway control plane, a user equipment identification (UE ID), a terminal address UE IP, a UE entry index, and a context index.

In a third aspect, a charging information processing method is provided and includes sending an indication identification set to a gateway forwarding plane, and receiving fourth charging information sent by the gateway forwarding plane, where the fourth charging information carries an indication identification, and the indication identification is an element in the indication identification set. When it is detected that a failure occurs to a link to the gateway forwarding plane, the method further includes determining, according to the indication identification, whether the fourth charging information needs to be saved.

In a first possible implementation manner, sending the indication identification set to the gateway forwarding plane may be specifically implemented by sending a charging policy to the gateway forwarding plane, where the charging policy includes the indication identification set.

In a fourth aspect, a charging information processing method is provided and includes receiving an indication identification set sent by a gateway control plane, and sending fourth charging information to the gateway control plane, where the fourth charging information carries an indication identification, and the indication identification is an element in the indication identification set. When it is detected that a failure occurs to a link to the gateway control plane, the method further includes determining, according to the indication identification, whether fifth charging information collected in a stage where the failure occurs to the link to the gateway control plane needs to be saved.

In a first possible implementation manner, receiving the indication identification set sent by the gateway control plane may be specifically implemented by receiving a charging policy sent by the gateway control plane, where the charging policy includes the indication identification set.

In a fifth aspect, a charging information processing method is provided and includes receiving a first charging bill sent by a first gateway, and sending a fourth message to the first gateway, where the fourth message is used for instructing the first gateway to save a second charging bill. The method further includes sending a fifth message to the first gateway, where the fifth message is used for instructing the first gateway to send the second charging bill, and receiving the second charging bill sent by the first gateway.

In a first possible implementation manner, when the fourth message is used for instructing the first gateway to save the second charging bill, the method may be specifically implemented by sending a fifth message to the first gateway, where the fifth message is used for instructing the first gateway to send the second charging bill, and receiving the second charging bill sent by the first gateway.

In a sixth aspect, a charging information processing method is provided and includes sending a first charging bill to a charging gateway, receiving a fourth message sent by the charging gateway, and saving a second charging bill according to the fourth message or delaying sending a second charging bill according to the fourth message.

In a first possible implementation manner, after saving the second charging bill according to the fourth message, the method may be specifically implemented by receiving a fifth message sent by the charging gateway, and sending the second charging bill to the charging gateway according to the fifth message.

In a seventh aspect, a gateway control plane is provided and includes a sending unit, configured to send to a gateway forwarding plane, a charging information identification set used for identifying charging information, a storage, configured to save first charging information sent by the gateway forwarding plane, where the first charging information carries a first charging information identification, and the first charging information identification is an element in the charging information identification set, a receiving unit, configured to receive second charging information sent by the gateway forwarding plane and saved by the gateway forwarding plane, where the second charging information carries a second charging information identification, and the second charging information identification is an element in the charging information identification set, and a processor, configured to combine, according to the first charging information identification and the second charging information identification, the first charging information saved by the storage and the second charging information received by the receiving unit.

In a first possible implementation manner, the processor is specifically configured to combine, according to correspondence between the first charging information identification and the second charging information identification, the first charging information saved by the storage and the second charging information received by the receiving unit.

In combination with the seventh aspect or the first possible implementation manner of the seventh aspect, in a second possible implementation manner, the storage is specifically configured to, when the storage detects that a failure occurs to a link to the gateway forwarding plane, save the first charging information. The receiving unit is specifically configured to, when the storage detects that the link to the gateway forwarding plane is recovered, receive the second charging information sent by the gateway forwarding plane and saved by the gateway forwarding plane.

In combination with the seventh aspect or the first possible implementation manner of the seventh aspect, in a third possible implementation manner, the storage is specifically configured to, when the sending unit sends a first message to the gateway forwarding plane, save the first charging information, where the first message is used for instructing the gateway forwarding plane to save the second charging information.

According to the third possible implementation manner, in a fourth possible implementation manner, the sending unit is further configured to send a second message to the gateway forwarding plane, where the second message is used for instructing the gateway forwarding plane to send the second charging information.

In combination with the seventh aspect or the first possible implementation manner or the second possible implementation manner or the third possible implementation manner or the fourth possible implementation manner of the seventh aspect, in a fifth possible implementation manner, the processor is further configured to, if the first charging information and the second charging information are successfully combined, generate a charging bill. If the first charging information and the second charging information fail to be combined, the processor is configured to record that the charging information is lost, or the sending unit is further configured to send a request message to the gateway forwarding plane, where the request message includes the first charging information identification, so that the gateway forwarding plane searches, according to the request message, for third charging information matching with the first charging information.

According to the fifth possible implementation manner, in a sixth possible implementation manner, the receiving unit is further configured to, if the gateway forwarding plane finds the third charging information, receive the third charging information sent by the gateway forwarding plane, where the third charging information carries a third charging information identification, and the third charging information identification is an element in the charging information identification set. The processor is further configured to combine the first charging information and the third charging information according to the first charging information identification and the third charging information identification. The receiving unit is further configured to, if the gateway forwarding plane does not find the third charging information, receive a third message sent by the gateway forwarding plane, where the third message is used for indicating that the charging information is lost.

In an eighth aspect, a gateway forwarding plane is provided and includes a receiving unit, configured to receive a charging information identification set sent by a gateway control plane and used for identifying charging information, where the receiving unit sends the charging information identification set to a first sending unit and a second sending unit. The first sending unit is configured to send first charging information to the gateway control plane, where the first charging information carries a first charging information identification, and the first charging information identification is an element in the charging information identification set. The gateway forwarding plane further includes a storage configured to save second charging information. The second sending unit is configured to send the second charging information saved by the storage to the gateway control plane, where the second charging information carries a second charging information identification, and the second charging information identification is an element in the charging information identification set, so that the gateway control plane combines, according to the first charging information identification and the second charging information identification, the first charging information sent by the first sending unit and the second charging information sent by the second sending unit.

In a first possible implementation manner, the storage is specifically configured to, when it is detected that a failure occurs to a link to the gateway control plane, save the second charging information. The second sending unit is specifically configured to, when it is detected that the link to the gateway control plane is recovered, send the second charging information to the gateway control plane.

In a second possible implementation manner, the receiving unit is further configured to receive a first message sent by the gateway control plane, and the storage is specifically configured to save the second charging information according to the first message received by the receiving unit.

According to the second possible implementation manner, in a third possible implementation manner, the receiving unit is further configured to receive a second message sent by the gateway control plane; and the second sending unit is specifically configured to send the second charging information to the gateway control plane according to the second message received by the receiving unit.

In combination with the eighth aspect or the first possible implementation manner or the second possible implementation manner or the third possible implementation manner of the eighth aspect, in a fourth possible implementation manner, the receiving unit is further configured to receive a request message sent by the gateway control plane, where the request message includes the first charging information identification. The gateway forwarding plane further includes a processor, where the processor is configured to search, according to the request message, for third charging information matching with the first charging information.

According to the fourth possible implementation manner, in a fifth possible implementation manner, if the processor finds the third charging information and sends the third charging information to the second sending unit, the second sending unit is further configured to send the third charging information to the gateway control plane, where the third charging information carries a third charging information identification, and the third charging information identification is an element in the charging information identification set, so that the gateway control plane combines the first charging information and the third charging information according to the first charging information identification and the third charging information identification. If the processor does not find the third charging information, the second sending unit is further configured to send a third message to the gateway control plane, where the third message is used for indicating that the charging information is lost.

In a ninth aspect, a gateway control plane is provided and includes a sending unit, configured to send an indication identification set to a gateway forwarding plane, a receiving unit, configured to receive fourth charging information sent by the gateway forwarding plane, where the fourth charging information carries an indication identification, and the indication identification is an element in the indication identification set, and a processor, configured to, when it is detected that a failure occurs to a link to the gateway forwarding plane, determine, according to the indication identification, whether the fourth charging information received by the receiving unit needs to be saved.

In a first possible implementation manner, the sending unit is specifically configured to send a charging policy to the gateway forwarding plane, where the charging policy includes the indication identification set.

In a tenth aspect, a gateway forwarding plane is provided and includes a receiving unit, configured to receive an indication identification set sent by a gateway control plane, a sending unit, configured to send fourth charging information to the gateway control plane, where the fourth charging information carries an indication identification, and the indication identification is an element in the indication identification set received by the receiving unit, and a processor, configured to, when it is detected that a failure occurs to a link to the gateway control plane, determine, according to the indication identification set received by the receiving unit, whether fifth charging information collected in a stage where the failure occurs to the link to the gateway control plane needs to be saved.

In a first possible implementation manner, the receiving unit is specifically configured to receive a charging policy sent by the gateway control plane, where the charging policy includes the indication identification set.

In an eleventh aspect, a charging gateway is provided and includes a receiving unit, configured to receive a first charging bill sent by a first gateway, and a sending unit, configured to send a fourth message to the first gateway, where the fourth message is used for instructing the first gateway to save a second charging bill or is used for instructing the first gateway to delay sending second charging bill.

In a first possible implementation manner, the sending unit is further configured to send a fifth message to the first gateway, where the fifth message is used for instructing the first gateway to send the second charging bill, and the receiving unit is further configured to receive the second charging bill sent by the first gateway.

In a twelfth aspect, a gateway is provided and includes a sending unit, configured to send a first charging bill to a charging gateway, a receiving unit, configured to receive a fourth message sent by the charging gateway, and a storage, configured to save a second charging bill according to the fourth message received by the receiving unit or delay sending a second charging bill according to the fourth message.

In a first possible implementation manner, the receiving unit is further configured to receive a fifth message sent by the charging gateway, and the sending unit is further configured to send the second charging bill to the charging gateway according to the fifth message received by the receiving unit.

In the embodiments of the present invention, a gateway control plane sends a charging information identification set to a gateway forwarding plane, and through an element in the charging information identification set, the gateway forwarding plane may combine first charging information and second charging information that are respectively saved by the gateway control plane and the gateway forwarding plane, so as to generate a charging bill, and therefore, a disaster recovery capability can be effectively improved and charging reliability can be ensured.

BRIEF DESCRIPTION OF THE DRAWINGS

To describe the technical solutions in the embodiments of the present invention more clearly, the accompanying drawings required for describing the embodiments are introduced briefly in the following. Apparently, the accompanying drawings in the following description show only some embodiments of the present invention, and persons of ordinary skill in the art may still derive other drawings from these accompanying drawings without creative efforts.

DETAILED DESCRIPTION OF ILLUSTRATIVE EMBODIMENTS

The technical solutions in the embodiments of the present invention are clearly and completely described in the following with reference to the accompanying drawings in the embodiments of the present invention. Apparently, the embodiments to be described are only a part rather than all of the embodiments of the present invention. All other embodiments obtained by persons of ordinary skill in the art based on the embodiments of the present invention without creative efforts shall fall within the protection scope of the present invention.

The technical solutions of the present invention are applicable to various types of communication systems, for example, a global system of mobile communication (GSM), a code division multiple access (CDMA) system, a wideband code division multiple access wireless (WCDMA) system, a general packet radio service (GPRS) system, and a long term evolution (LTE) system.

For example, the technical solutions of the present invention are applicable to a device decoupled by a control plane and a forwarding plane, such as an SGSN or a GGSN in a 2G/3G network, or an S-GW or a P-GW in SAE architecture.

To help persons skilled in the art understand the embodiments of the present invention, that a unified gateway control plane UGW-C in SAE architecture in a 3GPP evolved network is used as a gateway control plane, and a unified gateway forwarding plane UGW-U is used as a gateway forwarding plane is taken as an example for description. It should be noted that the embodiments of the present invention are not limited thereto, and another gateway device decoupled by the network control plane and forwarding plane is also applicable.

Figure 1:
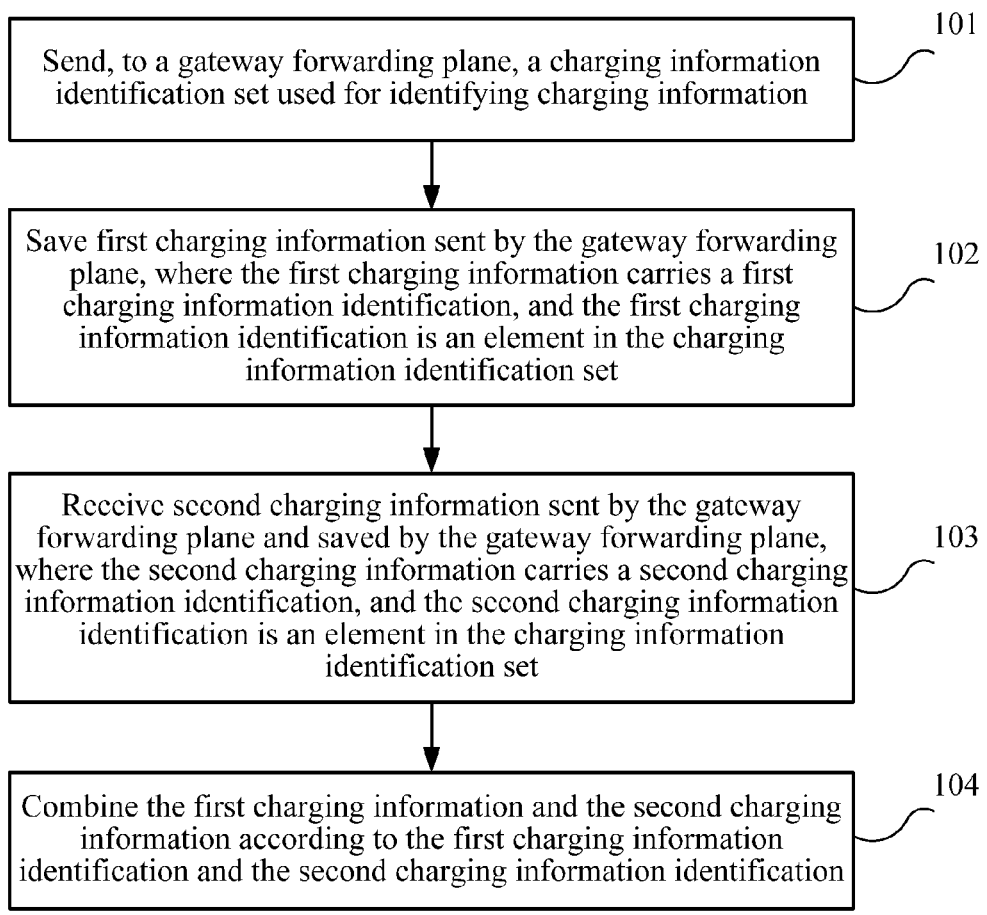
FIG. 1 is a flow chart of a charging information processing method according to an embodiment of the present invention.

FIG. 1 is a flow chart of a charging information processing method according to an embodiment of the present invention. The method shown in FIG. 1 is performed by a gateway control plane.

101: Send, to a gateway forwarding plane, a charging information identification set used for identifying charging information.

102: Save first charging information sent by the gateway forwarding plane, where the first charging information carries a first charging information identification, and the first charging information identification is an element in the charging information identification set.

103: Receive second charging information sent by the gateway forwarding plane and saved by the gateway forwarding plane, where the second charging information carries a second charging information identification, and the second charging information identification is an element in the charging information identification set.

104: Combine the first charging information and the second charging information according to the first charging information identification and the second charging information identification.

In the embodiment of the present invention, a gateway control plane sends a charging information identification set to a gateway forwarding plane, and through an element in the charging information identification set, the gateway forwarding plane may combine first charging information and second charging information that are respectively saved in the gateway control plane and the gateway forwarding plane, so as to generate a charging bill, and therefore, a disaster recovery capability can be effectively improved and charging reliability can be ensured.

Optionally, as an embodiment, an element in the charging information identification set may include one of or any combination of the following: a value generated by a gateway control plane, a user equipment identification UE ID, a user equipment address UE IP, a UE entry index, and a context index. It should be understood that selection of an identification of the charging information and a manner of identifying the charging information are not limited in the embodiment of the present invention.

Optionally, as another embodiment, a charging policy may be sent to the gateway forwarding plane, where the charging policy includes the charging information identification set. The charging policy may be configured on the gateway control plane, and may also be actively delivered by a policy and charging rules function (PCRF) to the gateway control plane, which is not limited in the present invention.

Optionally, as another embodiment, in step 102, the first charging information sent by the gateway forwarding plane may be saved when it is detected that a failure occurs to a link between the gateway control plane and the gateway forwarding plane, where the first charging information carries an element in the charging information identification set.

In step 103, the second charging information sent by the gateway forwarding plane and saved by the gateway forwarding plane may be received when it is detected that the link to the gateway forwarding plane is recovered, where the second charging information carries an element in the charging information identification set. A non-limitative example of the charging information processing method according to the embodiment of the present invention is described in further detail in the following with reference to FIG. 3.

Optionally, as another embodiment, in step 102, a first message may be sent to the gateway forwarding plane, and the received first charging information is saved at the same time, where the first message is used for instructing the gateway forwarding plane to save second charging information that is collected after the first message is received. Further, before step 103, a second message is sent to the gateway forwarding plane, where the second message is used for instructing the gateway forwarding plane to send the second charging information, the second charging information carries a second charging information identification, and the second charging information identification is an element in the charging information identification set. Therefore, if a failure occurs to a link between the gateway control plane and the gateway forwarding plane, the gateway control plane and the gateway forwarding plane both save the charging information in time, so that no loss of the charging information is caused. In this way, a disaster recovery capability of a system is improved. A non-limitative example of the charging information processing method according to the embodiment of the present invention is described in further detail in the following with reference to FIG. 4.

It should be noted that a determining manner for the gateway forwarding plane and/or the gateway control plane to save the charging information is not limited in the embodiment of the present invention, that is, no matter which manner is based to determine saving of the charging information by the gateway forwarding plane and/or the gateway control plane falls in the scope of the embodiment of the present invention.

Optionally, as another embodiment, in step 104, the first charging information and the second charging information are combined according to correspondence between the first charging information identification and the second charging information identification. For example, the first charging information identification is a value 5 generated by the gateway control plane, and if the second charging information identification carried in the second charging information is also 5, that is, the first charging information identification and the second charging information identification are consistent, the first charging information and the second charging information are combined. For another example, the first charging information identification is a value 2 and a UE ID h that are generated by the gateway control plane, and if the UE ID recorded in the second charging information identification carried in the second charging information is h, the first charging information and the second charging information are combined. For still another example, the gateway control plane presets that a generated value 2 matches with an UE ID h, and notifies the gateway forwarding plane of the matching. If the first charging information identification is the value 2 generated by the gateway control plane, and the UE ID recorded in the second charging information identification carried in the second charging information is h, the first charging information and the second charging information may be combined.

It should be understood that the number of first charging information identifications and the number of second charging information identifications may be one, and may also be multiple; and the number of the first charging information identifications and the number of the second charging information identifications may be equal, and may also be unequal, which is not limited in the embodiment of the present invention. In addition, a manner that the gateway control plane combines the first charging information and the second charging information according to the correspondence between the first charging information identification and the second charging information identification is not limited in the embodiment of the present invention either.

Optionally, as an embodiment, in step 104, if the first charging information and the second charging information are successfully combined, a charging bill is generated, and the charging bill may be sent to a charging gateway, or the charging bill may be saved first. For example, when it is detected that a failure occurs to a link between the gateway control plane and the charging gateway, the charging bill is saved. Or, the charging bill is saved according to an indication sent by the charging gateway. A non-limitative example of the charging information processing method according to the embodiment of the present invention is described in further detail in the following with reference to FIG. 11.

Optionally, as another embodiment, in step 104, the first charging information and the second charging information are combined, and if the combination fails, that the charging information is lost may be recorded and/or the second charging information is directly discarded; or a request message is sent to the gateway forwarding plane, where the request message includes the first charging information identification, so that the gateway forwarding plane searches, according to the request message, for third charging information matching with the first charging information.

Further, if the gateway forwarding plane finds the third charging information, the third charging information sent by the gateway forwarding plane is received, where the third charging information carries a third charging information identification, and the first charging information and the third charging information are combined according to the first charging information identification and the third charging information identification. Further, an implementation manner of combining the first charging information and the third charging information according to correspondence between the first charging information identification and the third charging information identification is as described in the foregoing, and details are not repeated herein. It should be understood that the number of elements in the charging information identification set may be one, and may also be multiple, which is not limited in the embodiment of the present invention. For example, the third charging information identification may include one of or any combination of the following: a value generated by the gateway control plane, a user equipment identification UE ID, a user equipment address UE IP, a UE entry index, and a context index. If the gateway forwarding plane does not find the third charging information, a third message sent by the gateway forwarding plane is received, where the third message is used for indicating that the charging information is lost. A non-limitative example of the charging information processing method according to the embodiment of the present invention is described in further detail in the following with reference to FIG. 5.

In the embodiment of the present invention, a gateway control plane actively sends a request message to a gateway forwarding plane, so that the gateway forwarding plane searches for matching charging information, and sends the matching charging information to the gateway control plane. In this way, a fault-tolerance capability of a system can be effectively improved and charging reliability can be ensured.

Figure 2:
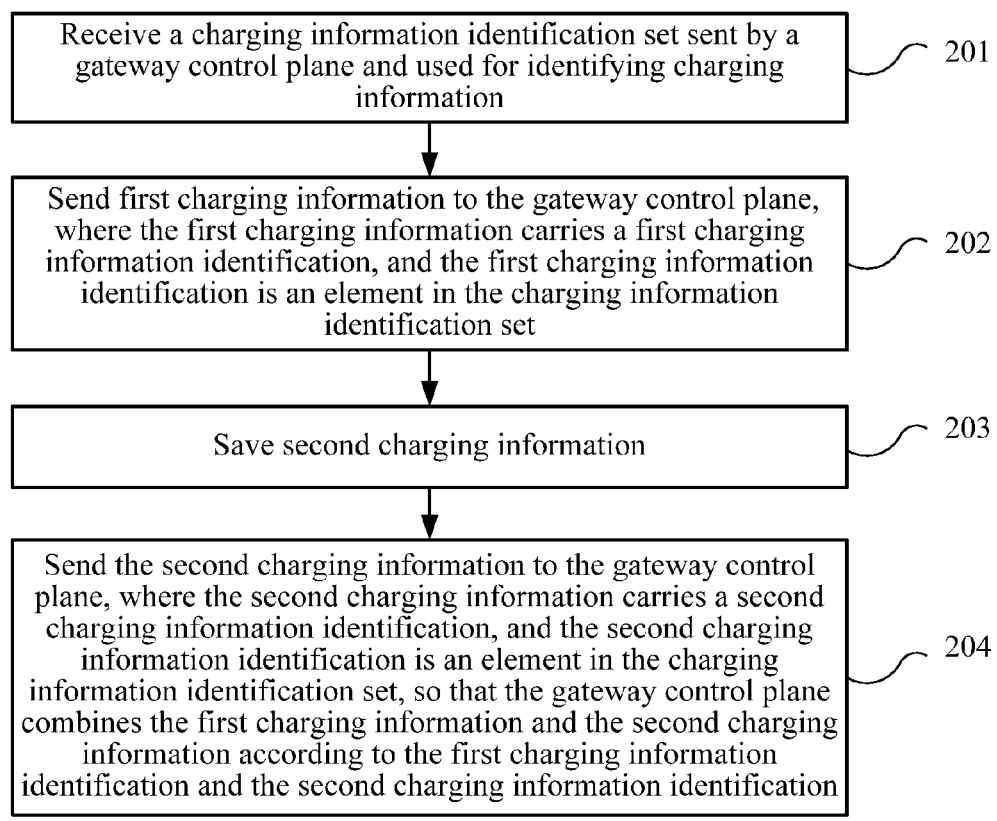
FIG. 2 is a flow chart of a charging information processing method according to another embodiment of the present invention.

FIG. 2 is a flow chart of a charging information processing method according to another embodiment of the present invention. The method shown in FIG. 2 is performed by a gateway forwarding plane, and is corresponding to the method shown in FIG. 1, and therefore, a description that is the same as that of the embodiment shown in FIG. 1 is appropriately omitted.

201: Receive a charging information identification set sent by a gateway control plane and used for identifying charging information.

202: Send first charging information to the gateway control plane, where the first charging information carries a first charging information identification, and the first charging information identification is an element in the charging information identification set.

203: Save second charging information.

204: Send the second charging information to the gateway control plane, where the second charging information carries a second charging information identification, and the second charging information identification is an element in the charging information identification set, so that the gateway control plane combines the first charging information and the second charging information according to the first charging information identification and the second charging information identification.

Optionally, as an embodiment, an element in the charging information identification set may include one of or any combination of the following: a value generated by the gateway control plane, a user equipment identification UE ID, a user equipment address UE IP, a UE entry index, and a context index. It should be understood that selection of an identification of the charging information and a manner of identifying the charging information are not limited in the embodiment of the present invention.

Optionally, as another embodiment, a charging policy sent by the gateway control plane may be received, where the charging policy includes the charging information identification set. The charging policy may be configured on the gateway control plane, and may also be actively delivered by a PCRF to the gateway control plane, which is not limited in the present invention.

Optionally, as another embodiment, in step 203, second charging information to be collected by the gateway forwarding plane in a failure period may be started to be saved when it is detected that a failure occurs to a link to the gateway control plane; and in step 204, the second charging information may be sent to the gateway control plane when it is detected that the link to the gateway control plane is recovered, where the second charging information carries an element in the charging information identification set. A non-limitative implementation manner of the charging information processing method according to the embodiment of the present invention is described in further detail in the following with reference to an example shown in FIG. 3.

Optionally, as another embodiment, before step 203, a first message sent by the gateway control plane may be received, and second charging information collected by the gateway forwarding plane after receiving the first message is saved according to the first message. Further, before step 204, a second message sent by the gateway control plane is received, and the second charging information is sent according to the second message, or the second charging information is sent to the gateway control plane according to a preset time limit. The second charging information carries an element in the charging information identification set. Therefore, if a failure occurs to a link between the gateway control plane and the gateway forwarding plane, the gateway forwarding plane saves the charging information in time, so that no loss of the charging information is caused. In this way, a disaster recovery capability of a system is improved. A non-limitative implementation manner of the charging information processing method according to the embodiment of the present invention is described in detail in the following with reference to an example shown in FIG. 4.

It should be noted that a determining manner for the gateway forwarding plane to save the charging information is not limited in the embodiment of the present invention, that is, no matter which manner is based to determine saving of the charging information by the gateway forwarding plane falls in the scope of the embodiment of the present invention.

Further, if the gateway control plane fails to combine the first charging information and the second charging information, the gateway forwarding plane receives a request message sent by the gateway control plane, where the request message includes the first charging information identification, and the gateway forwarding plane searches, according to the request message, for third charging information matching with the first charging information. Further, if the third charging information is found, the third charging information is sent to the gateway control plane, and the third charging information carries a third charging information identification, so that the gateway control plane combines the first charging information and the third charging information according to the first charging information identification and the third charging information identification, and generates a charging bill. If the third charging information is not found, a third message is sent to the gateway control plane, where the third message is used for indicating that the charging information is lost. It should be understood that the number of elements in the charging information identification set may be one, and may also be multiple, which is not limited in the embodiment of the present invention. For example, the third charging information identification may include one of or any combination of the following: a value generated by the gateway control plane, a user equipment identification UE ID, a user equipment address UE IP, a UE entry index, and a context index. A non-limitative implementation manner of the charging information processing method according to the embodiment of the present invention is described in detail in the following with reference to an example shown in FIG. 5.

In the embodiment of the present invention, a gateway forwarding plane receives a request message actively sent by a gateway control plane, so that the gateway forwarding plane searches, according to the request message, for matching charging information, and sends the matching charging information to the gateway control plane. In this way, a fault-tolerance capability of a system can be effectively improved and charging reliability can be ensured.

Figure 3:
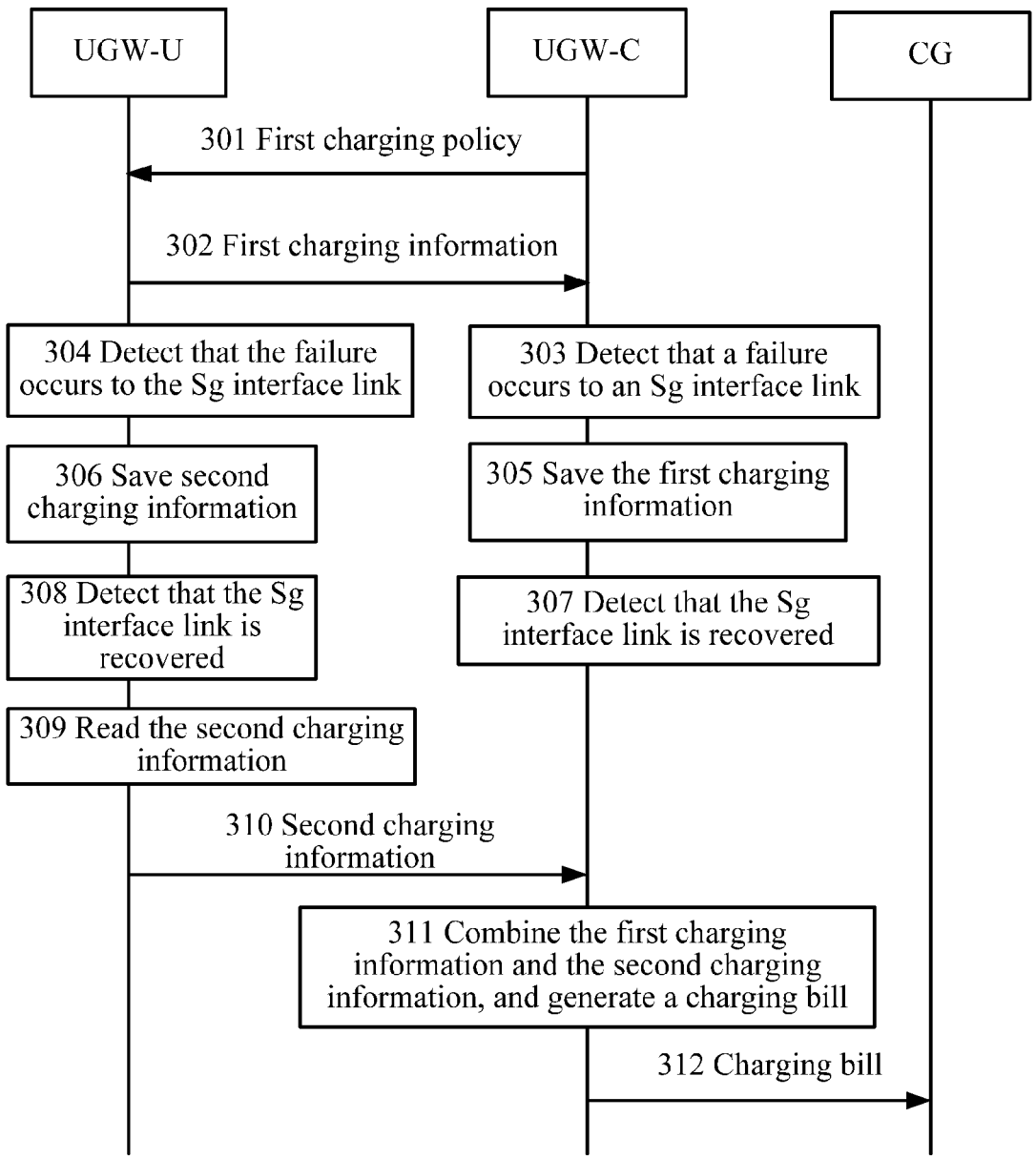
FIG. 3 is a schematic flow chart of a process of a charging information processing method according to another embodiment of the present invention.
Figure 4:
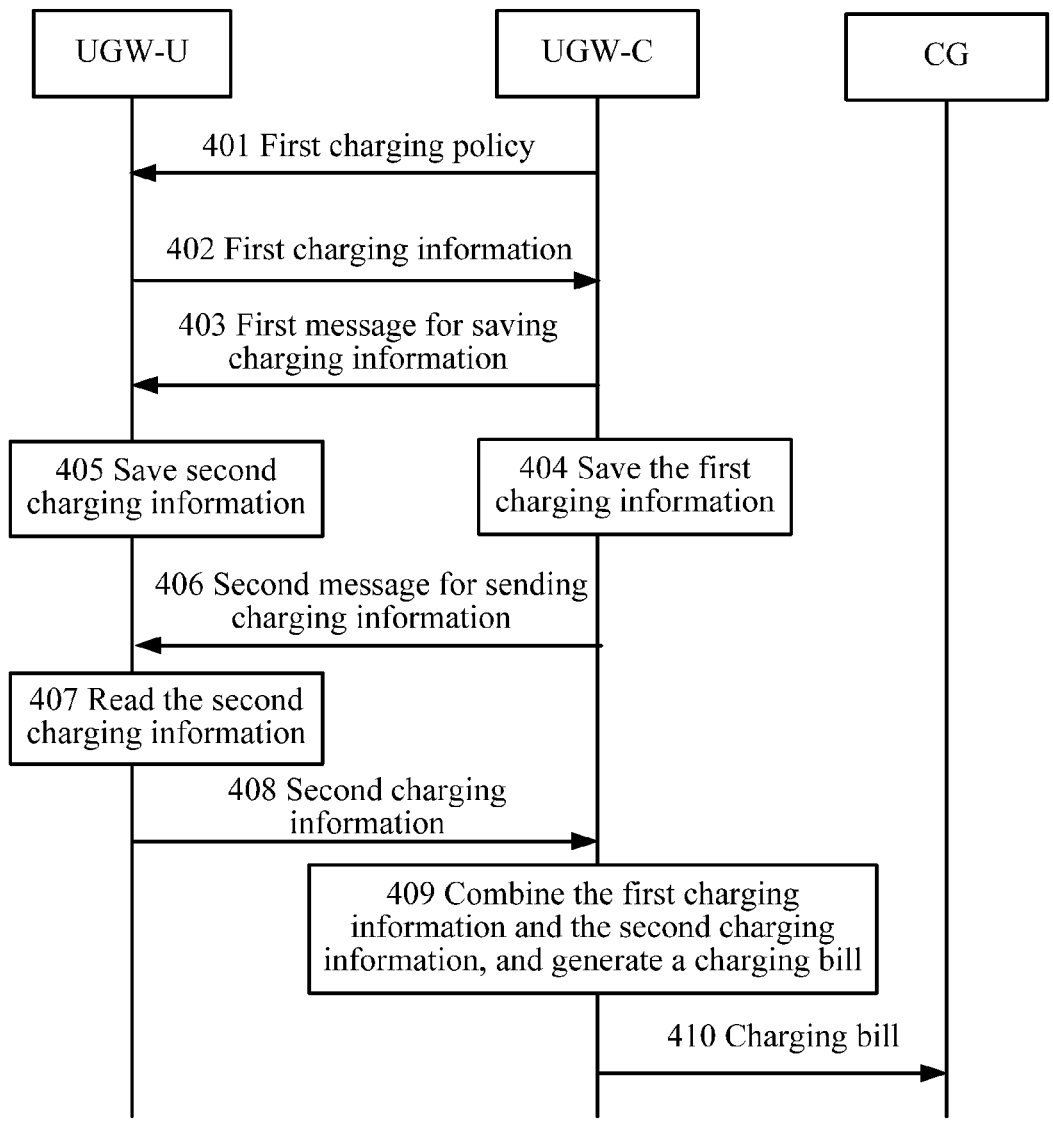
FIG. 4 is a schematic flow chart of a process of a charging information processing method according to another embodiment of the present invention.
Figure 5:
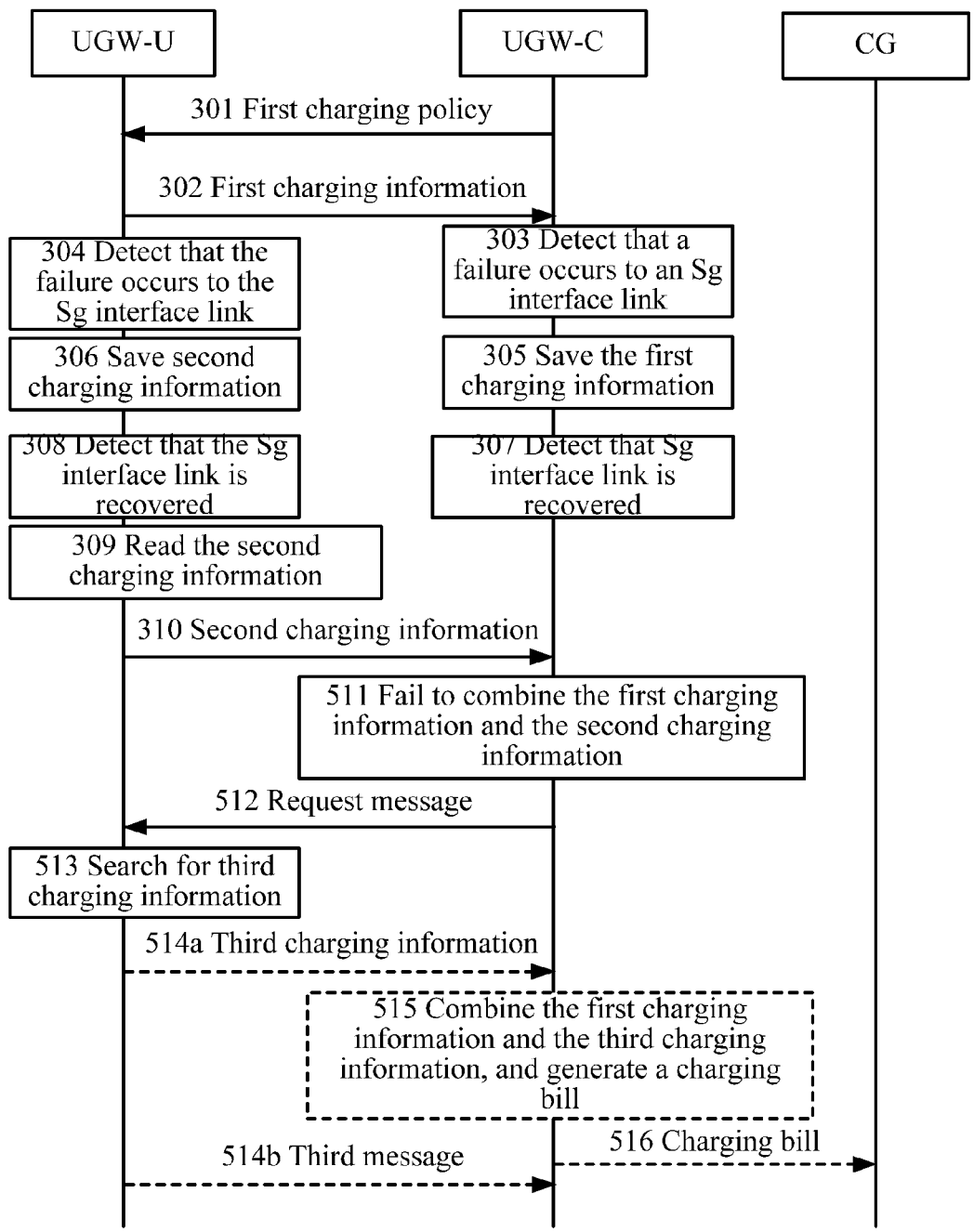
FIG. 5 is a schematic flow chart of a process of a charging information processing method according to another embodiment of the present invention.

The embodiment of the present invention is described in detail in the following with reference to specific examples. In FIG. 3 to FIG. 5 in the following, to help persons skilled in the art understand the embodiments of the present invention, that a UGW-C in SAE architecture in a 3GPP evolved network is used as a gateway control plane, and a UGW-U is used as a gateway forwarding plane is taken as an example for description. It should be noted that the embodiments of the present invention are not limited thereto, and another gateway device decoupled by the network control plane and forwarding plane is also applicable.

It should be understood that, in FIG. 3 to FIG. 5 in the following, selection of an element in a charging information identification set is only exemplary, but is not intended to limit the embodiment of the present invention.

FIG. 3 is a schematic flow chart of a process of a charging information processing method according to an embodiment of the present invention.

301: A UGW-C sends a first charging policy to a UGW-U.

The first charging policy includes a charging information identification set used for identifying charging information.

Optionally, an element in the charging information identification set may include one of or any combination of the following: a value generated by the UGW-C, a UE identification (ID), a UE Internet protocol (IP) address, a UE entry index, and a context index. It should be understood that selection of an identification of the charging information and a manner of identifying the charging information are not limited in the embodiment of the present invention.

302: The UGW-U sends first charging information to the UGW-C.

In step 301, after receiving the first charging policy sent by the UGW-C, the UGW-U acquires the charging information identification set. The UGW-U records a corresponding first charging information identification in collected first charging information, and sends the first charging information to the UGW-C.

303: The UGW-C detects that a failure occurs to an Sg interface link.

304: The UGW-U detects that the failure occurs to the Sg interface link.

When a failure occurs to a link between the UGW-C and the UGW-U, the UGW-C and the UGW-U both detect that the failure occurs to the Sg interface link.

305: The UGW-C saves the first charging information.

306: The UGW-U saves second charging information.

For example, the UGW-C saves the first charging information that is sent by the UGW-U and received in step 302. In a link failure period, the UGW-U collects second charging information, records a corresponding second charging information identification in the collected second charging information, and saves the second charging information.

307: The UGW-C detects that the Sg interface link is recovered.

308: The UGW-U detects that the Sg interface link is recovered.

309: The UGW-U reads the second charging information.

310: The UGW-U sends the second charging information to the UGW-C.

When the link between the UGW-C and the UGW-U is recovered, the UGW-C and the UGW-U both detect that the Sg interface link is recovered. The UGW-U reads the second charging information, and sends the second charging information to the UGW-C, where the second charging information carries the second charging information identification.

311: The UGW-C combines the first charging information and the second charging information, and generates a charging bill.

The UGW-C receives the second charging information, finds, according to the second charging information identification, the first charging information locally saved by the UGW-C, and combines the first charging information and the second charging information, to generate a charging bill record. For example, the first charging information identification is a value 5 generated by a gateway control plane, and the second charging information identification carried in the second charging information is also 5. Because the first charging information identification and the second charging information identification are consistent, the UGW-C may find, according to the second charging information identification 5, the first charging information that matches with the second charging information and is locally saved by the UGW-C, and combine the first charging information and the second charging information.

It should be understood that the number of first charging information identifications and the number of second charging information identifications may be one, and may also be multiple; and the number of the first charging information identifications and the number of the second charging information identifications may be equal, and may also be unequal, which is not limited in the embodiment of the present invention. In addition, a manner that the UGW-C combines the first charging information and the second charging information according to correspondence between the first charging information identification and the second charging information identification is not limited in the embodiment of the present invention either.

Further, if the first charging information and the second charging information are successfully combined, a charging bill is generated. Optionally, step 312 may be performed, or the charging bill may be saved first. For example, when it is detected that a failure occurs to a link between the UGW-C and a charging gateway CG, the charging bill is saved; or the charging bill is saved according to an indication sent by the charging gateway. If the first charging information and the second charging information fail to be combined, that the charging information is lost may be recorded and/or the second charging information is directly discarded; or a request message is sent to the UGW-U, where the request message includes the first charging information identification, so that the UGW-U searches, according to the request message, for third charging information matching with the first charging information.

312: The UGW-C sends the charging bill to the CG.

In the embodiment of the present invention, a UGW-C sends a first charging policy to a UGW-U, where the first charging policy includes a charging information identification set, and through a charging information identification, a gateway forwarding plane may combine, during a link failure, first charging information and second charging information that are respectively saved by the UGW-C and the UGW-U, so as to generate a charging bill, and therefore, a disaster recovery capability can be effectively improved and charging reliability can be ensured.

FIG. 4 is a schematic flow chart of a process of a charging information processing method according to another embodiment of the present invention.

401: A UGW-C sends a first charging policy to a UGW-U.

The first charging policy includes a charging information identification set used for identifying charging information.

Optionally, an element in the charging information identification set may include one of or any combination of the following: a value generated by the UGW-C, a UE ID, a UE IP address, a UE entry index, and a context index. It should be understood that selection of an identification of the charging information and a manner of identifying the charging information are not limited in the embodiment of the present invention.

402: The UGW-U sends first charging information to the UGW-C.

In step 401, after receiving the first charging policy sent by the UGW-C, the UGW-U acquires the charging information identification set. The UGW-U records a corresponding first charging information identification in collected first charging information, and sends the first charging information to the UGW-C.

403: The UGW-C sends, to the UGW-U, a first message for instructing the UGW-U to save charging information.

404: The UGW-C saves the first charging information.

405: The UGW-U saves second charging information.

For example, the UGW-C may send, to the UGW-U, a first message for instructing the UGW-U to save charging information, and save the received first charging information at the same time. The UGW-U saves, according to the first message, second charging information that is collected after the first message is received. A corresponding second charging information identification is recorded in the collected second charging information.

Therefore, if a failure occurs to a link between the UGW-C and the UGW-U, a gateway control plane and a gateway forwarding plane both save the charging information in time, so that no loss of the charging information is caused. In this way, a disaster recovery capability of a system is improved.

406: The UGW-C sends, to the UGW-U, a second message for instructing the UGW-U to send charging information.

407: The UGW-U reads the second charging information.

408: The UGW-U sends the second charging information to the UGW-C.

For example, a second message is sent to the UGW-U, where the second message is used for instructing the UGW-U to send the second charging information. The UGW-U reads the second charging information according to the second message, and sends the second charging information to the UGW-C, where the second charging information carries the second charging information identification.

409: The UGW-C combines the first charging information and the second charging information, and generates a charging bill.

The UGW-C receives the second charging information, finds, according to the second charging information identification, the first charging information locally saved by the UGW-C, and combines the first charging information and the second charging information, to generate a charging bill record. The UGW-C may preset correspondence between elements in the charging information identification set, and notify the UGW-U of the correspondence. For example, a value 2 generated by the UGW-C matches with a UE ID h. If the first charging information identification is the value 2 generated by the UGW-C and the second charging information identification carried in the second charging information is the UE ID h, because the first charging information identification is corresponding to the second charging information identification, the UGW-C may find, according to the second charging information identification h, the first charging information that matches with the second charging information and is locally saved by the UGW-C, and combine the first charging information and the second charging information.

It should be understood that the number of first charging information identifications and the number of second charging information identifications may be one, and may also be multiple; and the number of the first charging information identifications and the number of the second charging information identifications may be equal, and may also be unequal, which is not limited in the embodiment of the present invention. In addition, a manner that the UGW-C combines the first charging information and the second charging information according to correspondence between the first charging information identification and the second charging information identification is not limited in the embodiment of the present invention either.

Further, if the first charging information and the second charging information are successfully combined, a charging bill is generated. Optionally, step 410 may be performed, or the charging bill may be saved first. For example, when it is detected that a failure occurs to a link between the UGW-C and a charging gateway CG, the charging bill is saved; or the charging bill is saved according to an indication sent by the charging gateway. If the first charging information and the second charging information fail to be combined, that the charging information is lost may be recorded and/or the second charging information is directly discarded; or a request message is sent to the UGW-U, where the request message includes the first charging information identification, so that the UGW-U searches, according to the request message, for third charging information matching with the first charging information.

410: The UGW-C sends the charging bill to the CG.

In the embodiment of the present invention, a UGW-C sends a first charging policy to a UGW-U, where the first charging policy includes a charging information identification set. Through a charging information identification, a gateway forwarding plane may combine first charging information and second charging information that are respectively saved by the UGW-C and the UGW-U, so as to generate a charging bill, and therefore, a disaster recovery capability can be effectively improved and charging reliability can be ensured.

FIG. 5 is a schematic flow chart of a process of a charging information processing method according to another embodiment of the present invention. In FIG. 5, a process that is identical to or similar to that in FIG. 3 is represented with the same symbol, and a corresponding description is omitted. 301-310 in the process in FIG. 5 is similar to that in FIG. 3. A difference between FIG. 5 and FIG. 3 lies as follows.

511: The UGW-C fails to combine the first charging information and the second charging information.

For example, if the UGW-C fails to combine the first charging information and the second charging information, that the charging information is lost may be recorded and/or the second charging information is directly discarded; or step 512 is performed.

512: The UGW-C sends a request message to the UGW-U.

A request message is sent to the UGW-U, where the request message includes the first charging information identification.

513: The UGW-U searches for third charging information.

The UGW-U searches, according to the request message that is sent by the UGW-C and received in step 512, for third charging information matching with the first charging information.

514*a*: The UGW-U sends the third charging information to the UGW-C.

515: The UGW-C combines the first charging information and the third charging information, and generates a charging bill.

516: The UGW-C sends the charging bill to a CG.

Optionally, if the UGW-U finds the third charging information, the UGW-C receives the third charging information sent by the UGW-U, where the third charging information carries a third charging information identification, and combines the first charging information and the third charging information according to the first charging information identification and the third charging information identification. For an implementation manner of combining the first charging information and the third charging information according to correspondence between the first charging information identification and the third charging information identification, reference may be made to the implementation manner of combining the first charging information and the second charging information according to the correspondence between the first charging information identification and the second charging information identification, and details are not repeated herein.

If the first charging information and the third charging information are successfully combined, a charging bill is generated. Optionally, the UGW-C sends the charging bill to the CG. Or the UGW-C may save the charging bill first. For example, when it is detected that a failure occurs to a link between the UGW-C and the charging gateway CG, the charging bill is saved.

It should be understood that the number of first charging information identifications and the number of third charging information identifications may be one, and may also be multiple; and the number of the first charging information identifications and the number of the third charging information identifications may be equal, and may also be unequal, which is not limited in the embodiment of the present invention. In addition, a manner that the UGW-C combines the first charging information and the third charging information according to the correspondence between the first charging information identification and the third charging information identification is not limited in the embodiment of the present invention either.

514*b*: The UGW-U sends an indication that the charging information is lost to the UGW-C.

Optionally, if the UGW-U does not find the third charging information, the UGW-C receives a third message sent by the UGW-U, where the third message is used for indicating that the charging information is lost.

In the embodiment of the present invention, a UGW-U receives a request message actively sent by a UGW-C, so that the UGW-U searches, according to the request message, for matching charging information, and sends the matching charging information to the UGW-C. In this way, a fault-tolerance capability of a system can be effectively improved and charging reliability can be ensured.

Figure 6:
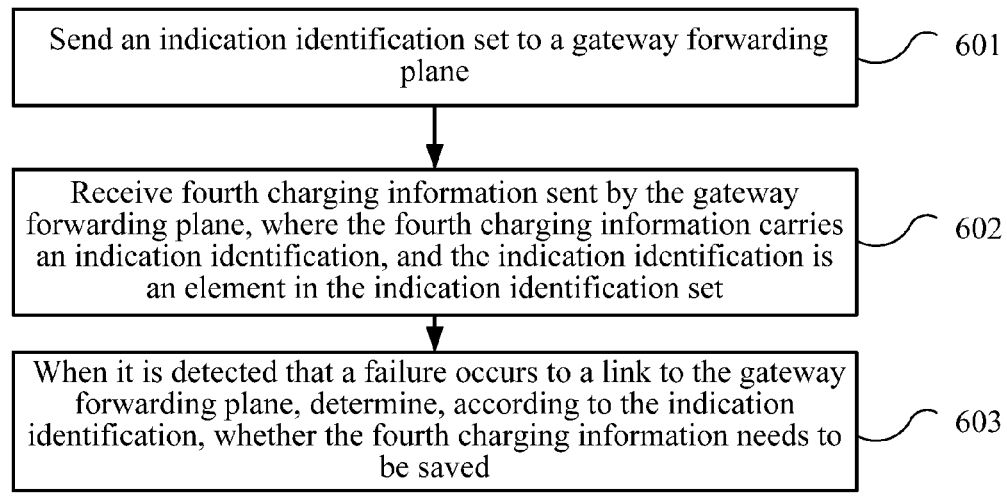
FIG. 6 is a flow chart of a charging information processing method according to an embodiment of the present invention.

FIG. 6 is a flow chart of a charging information processing method according to another embodiment of the present invention. The method shown in FIG. 6 is performed by a gateway control plane.

601: Send an indication identification set to a gateway forwarding plane.

602: Receive fourth charging information sent by the gateway forwarding plane, where the fourth charging information carries an indication identification, and the indication identification is an element in the indication identification set.

603: When it is detected that a failure occurs to a link to the gateway forwarding plane, determine, according to the indication identification, whether the fourth charging information needs to be saved.

Optionally, as an embodiment, when it is detected that a failure occurs to a link to the gateway forwarding plane, the gateway control plane may not save, according to the indication identification, charging information that is of some users and is sent by the gateway forwarding plane and/or may not save, according to the indication identification, charging information that is of a certain type of data services and is sent by the gateway forwarding plane. Or, the gateway control plane may save, according to the indication identification, only charging information that is of some users and is sent by the gateway forwarding plane and/or may save, according to the indication identification, only charging information that is of a certain type of data services and is sent by the gateway forwarding plane. It should be understood that an indicating manner of the indication identification is not limited in the embodiment of the present invention.

Optionally, as another embodiment, a charging policy may be sent to the gateway forwarding plane, where the charging policy includes the indication identification. The charging policy may be configured on the gateway control plane, and may also be actively delivered by a PCRF to the gateway control plane, which is not limited in the present invention.

It should be understood that, in the embodiment of the present invention, the number of elements in the indication identification set may be one, and may also be multiple, which is not limited in the embodiment of the present invention.

In the embodiment of the present invention, through an indication identification, a gateway forwarding plane and a gateway control plane may save or not save some charging information when a failure occurs to a link between the gateway forwarding plane and the gateway control plane. In this way, charging flexibility is improved.

Figure 7:
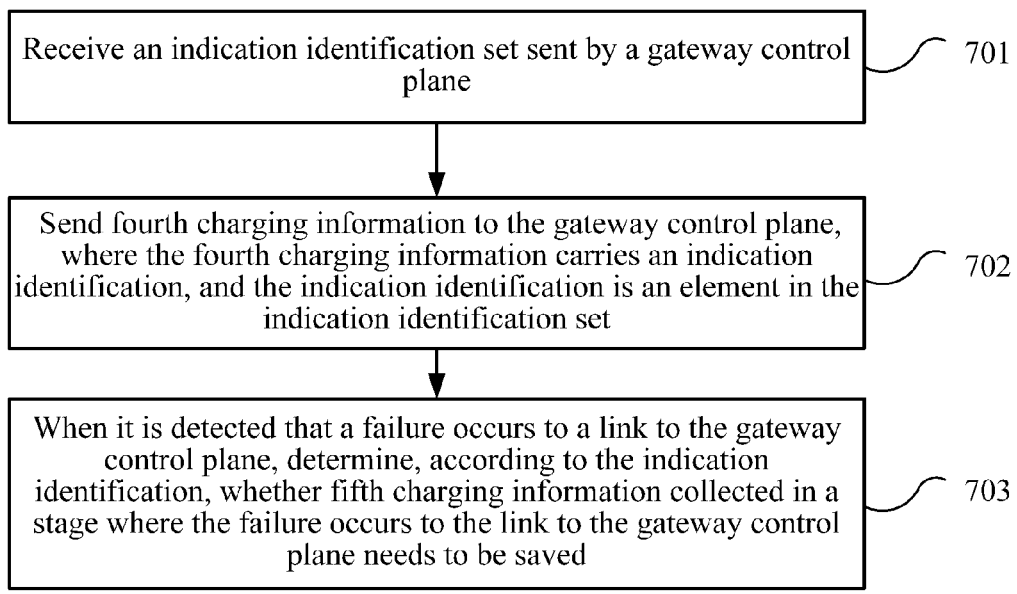
FIG. 7 is a flow chart of a charging information processing method according to another embodiment of the present invention.

FIG. 7 is a flow chart of a charging information processing method according to another embodiment of the present invention. The method shown in FIG. 7 is performed by a gateway forwarding plane.

701: Receive an indication identification set sent by a gateway control plane.

702: Send fourth charging information to the gateway control plane, where the fourth charging information carries an indication identification, and the indication identification is an element in the indication identification set.

703: When it is detected that a failure occurs to a link to the gateway control plane, determine, according to the indication identification, whether fifth charging information collected in a stage where the failure occurs to the link to the gateway control plane needs to be saved.

Optionally, as an embodiment, when it is detected that a failure occurs to a link between the gateway control plane and the gateway forwarding plane, the gateway forwarding plane may not save, according to the indication identification, charging information that is of some users and is collected in a stage where the failure occurs to the link to the gateway control plane and/or may not save, according to the indication identification, charging information that is of a certain type of data services and is collected in a stage where the failure occurs to the link to the gateway control plane. Or, the gateway forwarding plane may save, according to the indication identification, only charging information that is of some users and is collected in a stage where the failure occurs to the link to the gateway control plane and/or may save, according to the indication identification, only charging information that is of a certain type of data services and is collected in a stage where the failure occurs to the link to the gateway control plane. It should be understood that an indicating manner of the indication identification is not limited in the embodiment of the present invention.

Optionally, as another embodiment, a charging policy sent by the gateway control plane may be received, where the charging policy includes the indication identification. The charging policy may be configured on the gateway control plane, and may also be actively delivered by a PCRF to the gateway control plane, which is not limited in the present invention.

It should be understood that, in the embodiment of the present invention, the number of elements in the indication identification set may be one, and may also be multiple, which is not limited in the embodiment of the present invention.

In the embodiment of the present invention, through an indication identification, a gateway forwarding plane and a gateway control plane may save or not save some charging information when a failure occurs to a link between the gateway forwarding plane and the gateway control plane. In this way, charging flexibility is improved.

Figure 8:
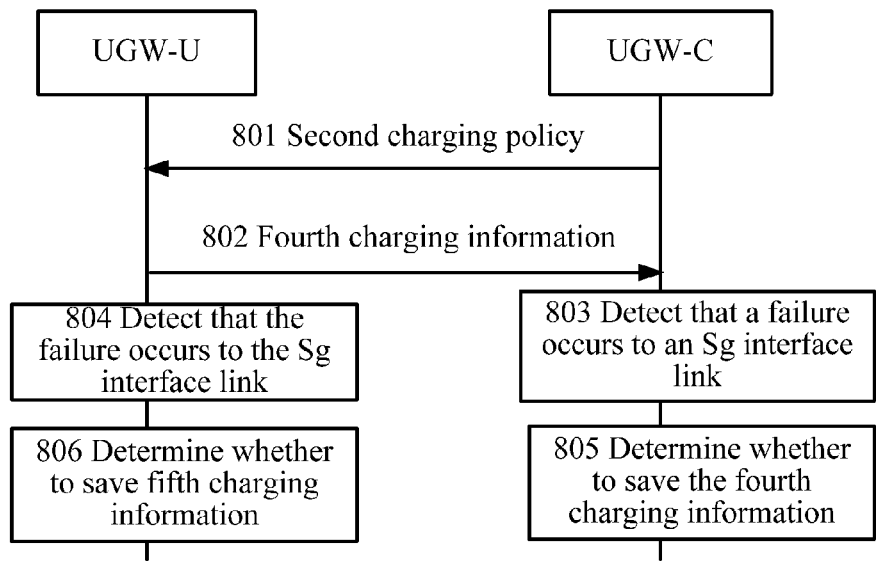
FIG. 8 is a schematic flow chart of a process of a charging information processing method according to another embodiment of the present invention.

The embodiment of the present invention is described in detail in the following with reference to specific examples. In FIG. 8, to help persons skilled in the art understand the embodiment of the present invention, that a UGW-C in SAE architecture in a 3GPP evolved network is used as a gateway control plane, and a UGW-U is used as a gateway forwarding plane is taken as an example for description. It should be noted that the embodiment of the present invention is not limited thereto, and another gateway device decoupled by the network control plane and forwarding plane is also applicable.

It should be understood that, in the embodiment of the present invention, the number of elements in an indication identification set may be one, and may also be multiple, which is not limited in the embodiment of the present invention. It should be further understood that, in the embodiment of the present invention, selection of an element in the indication identification set is only exemplary, but is not intended to limit the embodiment of the present invention.

FIG. 8 is a schematic flow chart of a process of a charging information processing method according to another embodiment of the present invention.

801: A UGW-C sends a second charging policy to a UGW-U.

The second charging policy includes an indication identification set, for example, an element w in the indication identification set indicates that charging information of a UE ID that is w is not saved.

802: The UGW-U sends fourth charging information to the UGW-C.

For example, the UGW-U collects fourth charging information of a user with a UE ID being w, records w in the fourth charging information, and sends the fourth charging information to the UGW-C.

803: The UGW-C detects that a failure occurs to a Sg interface link.

804: The UGW-U detects that the failure occurs to the Sg interface link.

When a failure occurs to a link between the UGW-C and the UGW-U, the UGW-C and the UGW-U both detect that the failure occurs to the Sg interface link.

805: The UGW-C determines whether to save the fourth charging information.

For example, if an indication identification of the fourth charging information is w, the UGW-C may not save the fourth charging information, and optionally, may directly discard the fourth charging information.

806: The UGW-U determines whether to save fifth charging information.

For example, in a link failure period, the UGW-U collects fifth charging information of the user with the UE ID being w and does not save the fifth charging information.

Therefore, in the embodiment of the present invention, through an indication identification, a UGW-U and a UGW-C may save or not save some charging information when a failure occurs to a link between the gateway forwarding plane and the gateway control plane. In this way, charging flexibility is improved.

Figure 9:
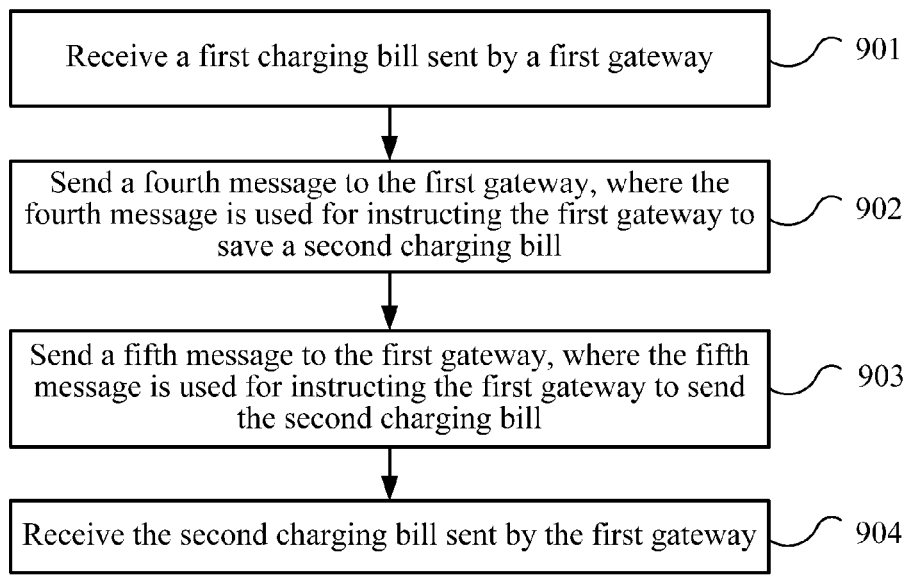
FIG. 9 is a flow chart of a charging information processing method according to an embodiment of the present invention.

FIG. 9 is a flow chart of a charging information processing method according to an embodiment of the present invention. The method shown in FIG. 9 is performed by a charging gateway CG.

901: Receive a first charging bill sent by a first gateway.

902: Send a fourth message to the first gateway, where the fourth message is used for instructing the first gateway to save a second charging bill or is used for instructing the first gateway to delay sending second charging bill.

The first gateway may include a packet data network gateway (P-GW), a packet data serving node (PDSN), a Worldwide Interoperability for Microwave Access (WiMAX) Access Serving Network (WASN), or a UGW-C, and it should be understood that the foregoing is not limited in the present invention.

Optionally, as an embodiment, when the fourth message is used for instructing the first gateway to save the second charging bill, a fifth message may further be sent to the first gateway, where the fifth message is used for instructing the first gateway to send the second charging bill, and the second charging bill sent by the first gateway is received. A non-limitative implementation manner of the charging information processing method according to the embodiment of the present invention is described in detail in the following with reference to an example shown in FIG. 11.

Optionally, as another embodiment, when the fourth message is used for instructing the first gateway to delay sending the second charging information, a delay time may be preset by the charging gateway and notified to the first gateway, and may also be preset by the first gateway, which is not limited in the present invention.

Therefore, in the embodiment of the present invention, a charging gateway instructs a first gateway to save a charging bill or delay sending a charging bill, and when a failure occurs to a link between the first gateway and the charging gateway, the first gateway saves the charging bill in time, so that no loss of the charging bill is caused. In this way, a disaster recovery capability of a system is improved.

Figure 10:
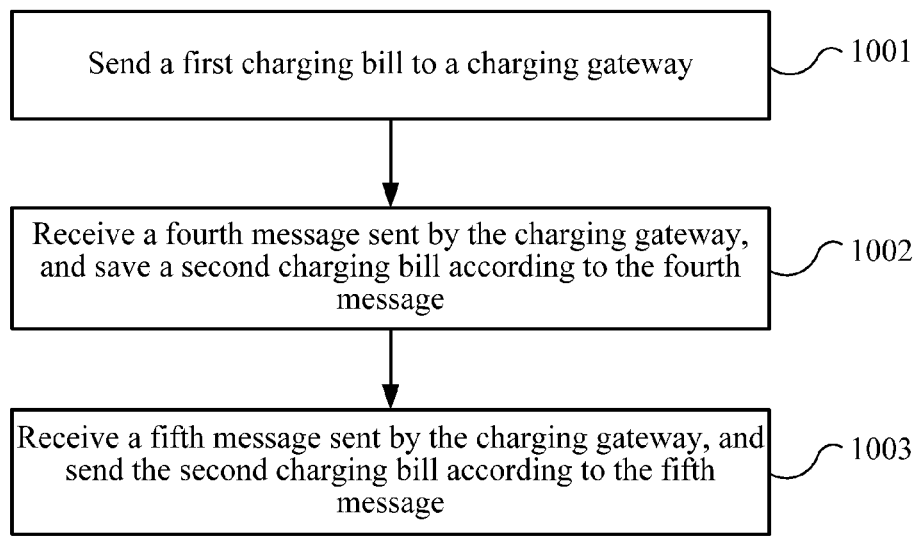
FIG. 10 is a flow chart of a charging information processing method according to another embodiment of the present invention.

FIG. 10 is a flow chart of a charging information processing method according to another embodiment of the present invention. The method shown in FIG. 10 is performed by a first gateway.

The first gateway may include a P-GW, a PDSN, a WASN or a UGW-C. It should be understood that the foregoing is not limited in the present invention.

1001: Send a first charging bill to a charging gateway.

1002: Receive a fourth message sent by the charging gateway.

1003: Save a second charging bill according to the fourth message or delay sending a second charging bill according to the fourth message.

Optionally, as an embodiment, after the second charging bill is saved according to the fourth message, a fifth message sent by the charging gateway may further be received; and the second charging bill is sent to the charging gateway according to the fifth message. A non-limitative implementation manner of the charging information processing method according to the embodiment of the present invention is described in detail in the following with reference to the example shown in FIG. 11.

Optionally, as another embodiment, when the sending of the second charging bill is delayed according to the fourth message, a delay time may be preset by the charging gateway and notified to the first gateway, and may also be preset by the first gateway, which is not limited in the present invention.

Therefore, in the embodiment of the present invention, a charging gateway instructs a first gateway to save a charging bill or delay sending a charging bill, and when a failure occurs to a link between the first gateway and the charging gateway, the first gateway saves the charging bill in time, so that no loss of the charging bill is caused. In this way, a disaster recovery capability of a system is improved.

A non-limitative implementation manner of the charging information processing method according to the embodiment of the present invention is described in detail in the following with reference to the example shown in FIG. 11. To help persons skilled in the art understand the embodiment of the present invention, in FIG. 11, that a UGW-C is used as a first gateway is taken as an example for description. It should be noted that the embodiment of the present invention is not limited thereto, and the first gateway may also be a P-GW, a PDSN, or a WASN.

Figure 11:
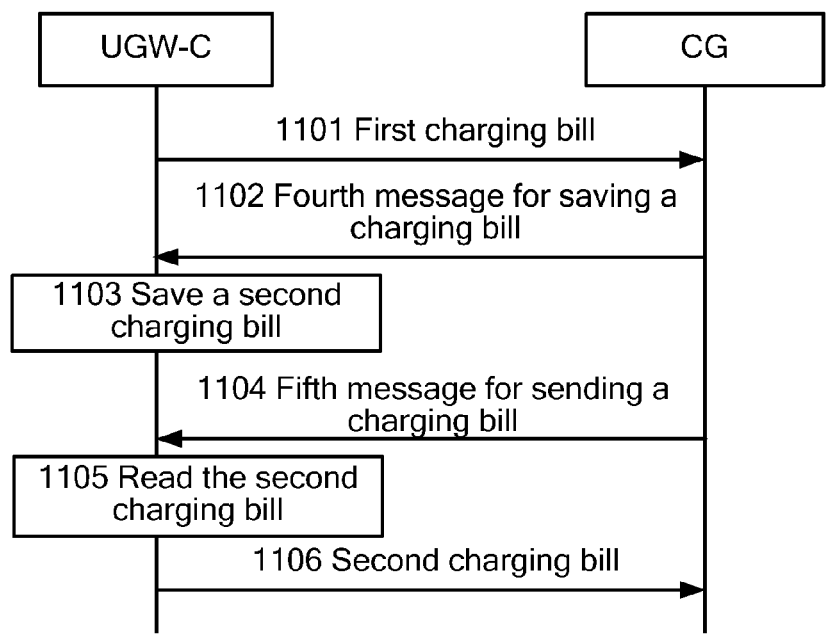
FIG. 11 is a schematic flow chart of a process of a charging information processing method according to another embodiment of the present invention.

FIG. 11 is a schematic flow chart of a process of a charging information processing method according to another embodiment of the present invention.

1101: A UGW-C sends a first charging bill to a CG.

1102: The CG sends, to the gateway, a fourth message for instructing the UGW-C to save a charging bill.

1103: The UGW-C saves a second charging bill.

For example, the UGW-C receives charging information sent by the UGW-U, generates a second charging bill and saves the second charging bill.

1104: The CG sends, to the gateway, a fifth message for instructing the UGW-C to send a charging bill.

1105: The UGW-C reads the second charging bill.

1106: The UGW-C sends the second charging bill to the CG.

Therefore, in the embodiment of the present invention, a CG instructs a UGW-C to save a charging bill, and when a failure occurs to a link between the UGW-C and the CG, the UGW-C saves the charging bill in time, so that no loss of the charging bill is caused. In this way, a disaster recovery capability of a system is improved.

Figure 12:
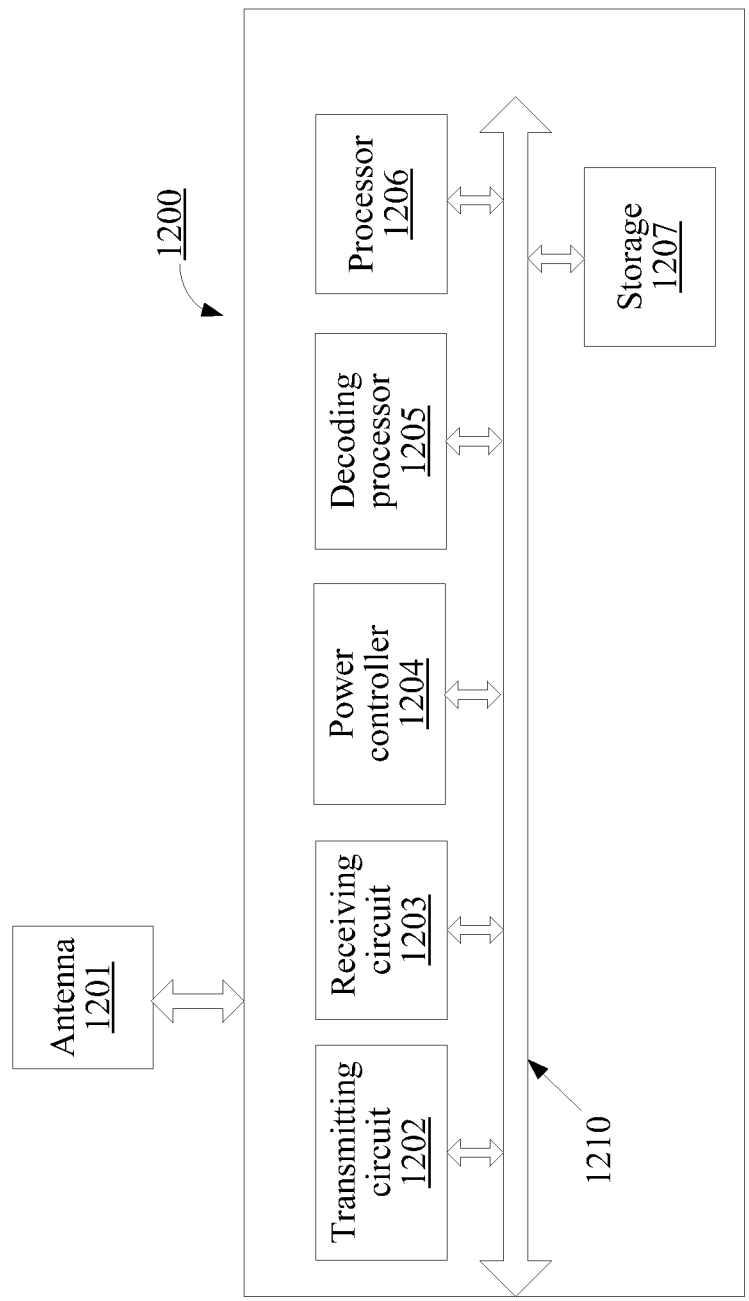
FIG. 12 is a block diagram of a device according to an embodiment of the present invention.

An embodiment of the present invention further provides an apparatus embodiment for implementing the steps and the method in each foregoing method embodiment. The embodiment of the present invention is applicable to gateway forwarding planes, gateway control planes, first gateways or charging gateways in various types of communication systems. FIG. 12 shows an embodiment of a device, and in this embodiment, a device 1200 includes a transmitting circuit 1202, a receiving circuit 1203, a power controller 1204, a decoding processor 1205, a processor 1206, a storage 1207, and an antenna 1201. The processor 1206 controls an operation of the device 1200, and the processor 1206 may also be referred to as a central processing unit CPU or a processor. The storage 1207 may include a read-only memory and a random access memory, and provide instructions and data for the processor 1206. A part of the storage 1207 may further include a nonvolatile random access memory (NVRAM). In a specific application, the device 1200 may be embedded in or the device 1200 may be, for example, a radio communication device such as a mobile phone, and may further include a carrier that accommodates the transmitting circuit 1202 and the receiving circuit 1203, to allow data transmission and reception between the device 1200 and a remote position. The transmitting circuit 1202 and the receiving circuit 1203 may be coupled to the antenna 1201. Components of the device 1200 are coupled together through a bus system 1210, where in addition to a data bus, the bus system 1210 further includes a power bus, a control bus, and a status signal bus. However, for clear description, the buses in the figure are all marked as the bus system 1210. The device 1200 may further include the processor 1206 configured to process a signal, and may further include the power controller 1204 and the decoding processor 1205.

The method disclosed in the embodiment of the present invention may be implemented by the device 1200, or mainly implemented by the processor 1206 and the transmitting circuit 1202 in the device 1200. The processor 1206 may be an integrated circuit chip, and has a signal processing capability. In an implementation process, the steps in the method may be implemented through an integrated logic circuit in the form of hardware in the processor 1206 or through instructions in the form of software. To implement the method disclosed in the embodiment of the present invention, the decoding processor may be a general processor, a digital signal processor (DSP), an application specific integrated circuit (ASIC), a field programmable gate array (FPGA) or another programmable logic device, a discrete gate or a transistor logic device, or a discrete hardware device. The methods, steps and logic block diagrams disclosed in the embodiments of the present invention may be implemented or executed. The general processor may be a microprocessor or the processor may also be any normal processor, decoder and the like. The steps of the method disclosed in the embodiment of the present invention may be directly performed by the decoding processor in the form of hardware, or performed by a combination of hardware and a software module in the decoding processor. The software module may be located in a storage medium that is mature in the field such as a random access memory, a flash memory, a read-only memory, a programmable read-only memory or an electrically erasable programmable memory, or a register. The storage medium is located in the storage 1207, and a decoding unit reads information in the storage 1207, so as to implement the steps of the foregoing method in combination of a hardware capability thereof.

Figure 13:
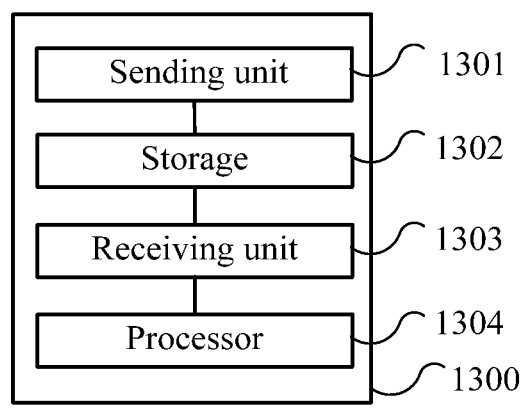
FIG. 13 is a structural block diagram of a gateway control plane according to an embodiment of the present invention.

Further, FIG. 13 is a structural block diagram of a gateway control plane according to an embodiment of the present invention. A gateway control plane 1300 shown in FIG. 13 includes a sending unit 1301, a storage 1302, a receiving unit 1303, and a processor 1304.

The sending unit 1301 is configured to send, to a gateway forwarding plane, a charging information identification set used for identifying charging information.

The storage 1302 is configured to save first charging information sent by the gateway forwarding plane, where the first charging information carries a first charging information identification, and the first charging information identification is an element in the charging information identification set.

The receiving unit 1303 is configured to receive second charging information sent by the gateway forwarding plane and saved by the gateway forwarding plane, where the second charging information carries a second charging information identification, and the second charging information identification is an element in the charging information identification set.

The processor 1304 is configured to combine, according to the first charging information identification and the second charging information identification, the first charging information saved by the storage 1302 and the second charging information received by the receiving unit 1303.

In the embodiment of the present invention, a gateway control plane sends a charging information identification set to a gateway forwarding plane, and through an element in the charging information identification set, the gateway forwarding plane may combine first charging information and second charging information that are respectively saved by the gateway control plane and the gateway forwarding plane, so as to generate a charging bill, and therefore, a disaster recovery capability can be effectively improved and charging reliability can be ensured.

The gateway control plane 1300 may implement operations related to the gateway control plane in the embodiments shown in FIG. 1 to FIG. 5, and details are not repeated herein.

Optionally, as an embodiment, an element in the charging information identification set includes one of or any combination of the following: a value generated by the gateway control plane, a user equipment identification UE ID, a terminal address UE IP, a UE entry index, and a context index.

Optionally, as another embodiment, the processor 1304 is specifically configured to combine, according to correspondence between the first charging information identification and the second charging information identification, the first charging information saved by the storage 1302 and the second charging information received by the receiving unit 1303.

Optionally, as another embodiment, when the processor 1304 detects that a failure occurs to a link to the gateway forwarding plane, the storage 1302 is specifically configured to save the first charging information; and when the processor 1304 detects that the link to the gateway forwarding plane is recovered, the receiving unit 1303 is specifically configured to receive the second charging information sent by the gateway forwarding plane and saved by the gateway forwarding plane.

Optionally, as another embodiment, the sending unit 1301 sends a first message to the gateway forwarding plane, and the storage 1302 is specifically configured to save the first charging information, where the first message is used for instructing the gateway forwarding plane to save the second charging information. Further, the sending unit 1301 is further configured to send a second message to the gateway forwarding plane, where the second message is used for instructing the gateway forwarding plane to send the second charging information.

Therefore, if a failure occurs to a link between the gateway control plane and the gateway forwarding plane, the gateway control plane and the gateway forwarding plane both save the charging information in time, so that no loss of the charging information is caused. In this way, a disaster recovery capability of a system is improved.

Optionally, as another embodiment, the processor 1304 is further configured to, if the first charging information and the second charging information are successfully combined, generate a charging bill; and if the first charging information and the second charging information fail to be combined, record that the charging information is lost, or the sending unit 1301 is further configured to send a request message to the gateway forwarding plane, where the request message includes the first charging information identification, so that the gateway forwarding plane searches, according to the request message, for third charging information matching with the first charging information.

Optionally, as another embodiment, the receiving unit 1303 is further configured to, if the gateway forwarding plane finds the third charging information, receive the third charging information sent by the gateway forwarding plane, where the third charging information carries a third charging information identification, and the third charging information identification is an element in the charging information identification set; and the processor 1304 is further configured to combine the first charging information and the third charging information according to the first charging information identification and the third charging information identification. Or the receiving unit 1303 is further configured to, if the gateway forwarding plane does not find the third charging information, receive a third message sent by the gateway forwarding plane, where the third message is used for indicating that the charging information is lost.

In the embodiment of the present invention, a gateway control plane actively sends a request message to a gateway forwarding plane, so that the gateway forwarding plane searches for matching charging information, and sends the matching charging information to the gateway control plane. In this way, a fault-tolerance capability of a system can be effectively improved and charging reliability can be ensured.

Figure 14:
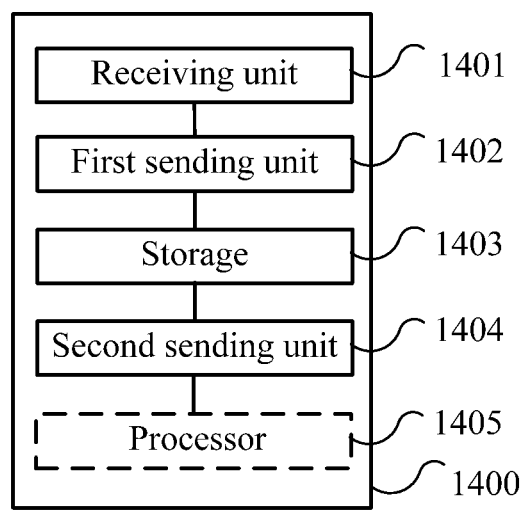
FIG. 14 is a structural block diagram of a gateway forwarding plane according to another embodiment of the present invention.

FIG. 14 is a structural block diagram of a gateway forwarding plane according to another embodiment of the present invention. A gateway forwarding plane 1400 shown in FIG. 14 includes a receiving unit 1401, a first sending unit 1402, a storage 1403, and a second sending unit 1404.

The receiving unit 1401 is configured to receive a charging information identification set sent by a gateway control plane and used for identifying charging information, where the receiving unit 1401 sends the charging information identification set to the first sending unit 1402 and the second sending unit 1404.

The first sending unit 1402 is configured to send first charging information to the gateway control plane, where the first charging information carries a first charging information identification, and the first charging information identification is an element in the charging information identification set.

The storage 1403 is configured to save second charging information.

The second sending unit 1404 is configured to send the second charging information saved by the storage 1403 to the gateway control plane, where the second charging information carries a second charging information identification, and the second charging information identification is an element in the charging information identification set, so that the gateway control plane combines, according to the first charging information identification and the second charging information identification, the first charging information sent by the first sending unit and the second charging information sent by the second sending unit.

In the embodiment of the present invention, a gateway control plane sends a charging information identification set to a gateway forwarding plane, and through an element in the charging information identification set, the gateway forwarding plane may combine first charging information and second charging information that are respectively saved by the gateway control plane and the gateway forwarding plane, so as to generate a charging bill, and therefore, a disaster recovery capability can be effectively improved and the charging reliability can be ensured.

The gateway forwarding plane 1400 may implement operations related to the gateway forwarding plane in the embodiments shown in FIG. 1 to FIG. 5, and details are not repeated herein.

Optionally, as an embodiment, an element in the charging information identification set includes one of or any combination of the following: a value generated by the gateway control plane, a user equipment identification UE ID, a terminal address UE IP, a UE entry index, and a context index.

Optionally, as another embodiment, the storage 1403 is specifically configured to, when it is detected that a failure occurs to a link to the gateway control plane, save the second charging information. The second sending unit 1404 is specifically configured to, when it is detected that the link to the gateway control plane is recovered, send the second charging information to the gateway control plane.

Optionally, as another embodiment, the receiving unit 1401 is further configured to receive a first message sent by the gateway control plane, and the storage 1403 is specifically configured to save the second charging information according to the first message received by the receiving unit 1401. Further, the receiving unit 1401 is further configured to receive a second message sent by the gateway control plane, and the second sending unit 1404 is specifically configured to send the second charging information to the gateway control plane according to the second message received by the receiving unit 1401.

Therefore, if a failure occurs to a link between the gateway control plane and the gateway forwarding plane, the gateway forwarding plane saves the charging information in time, so that no loss of the charging information is caused. In this way, a disaster recovery capability of a system is improved.

Optionally, as another embodiment, the receiving unit 1401 is further configured to receive a request message sent by the gateway control plane, where the request message includes the first charging information identification. The gateway forwarding plane may further include a processor 1405, where the processor 1405 is configured to search, according to the request message, for third charging information matching with the first charging information.

Optionally, as another embodiment, if the processor 1405 finds the third charging information and sends the third charging information to the second sending unit 1404, the second sending unit 1404 is further configured to send the third charging information to the gateway control plane, where the third charging information carries a third charging information identification, and the third charging information identification is an element in the charging information identification set, so that the gateway control plane combines the first charging information and the third charging information according to the first charging information identification and the third charging information identification. If the processor 1405 does not find the third charging information, the second sending unit 1404 is further configured to send a third message to the gateway control plane, where the third message is used for indicating that the charging information is lost.

In the embodiment of the present invention, a gateway control plane actively sends a request message to a gateway forwarding plane, so that the gateway forwarding plane searches for matching charging information, and sends the matching charging information to the gateway control plane. In this way, a fault-tolerance capability of a system can be effectively improved and charging reliability can be ensured.

Figure 15:
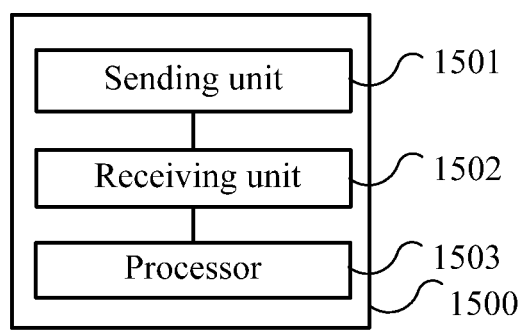
FIG. 15 is a structural block diagram of a gateway control plane according to an embodiment of the present invention.

FIG. 15 is a structural block diagram of a gateway control plane according to an embodiment of the present invention. A gateway control plane 1500 shown in FIG. 15 includes a sending unit 1501, a receiving unit 1502, and a processor 1503.

The sending unit 1501 is configured to send an indication identification set to a gateway forwarding plane.

The receiving unit 1502 is configured to receive fourth charging information sent by the gateway forwarding plane, where the fourth charging information carries an indication identification, and the indication identification is an element in the indication identification set.

The processor 1503 is configured to, when it is detected that a failure occurs to a link to the gateway forwarding plane, determine, according to the indication identification, whether the fourth charging information received by the receiving unit needs to be saved.

The gateway control plane 1500 may implement operations related to the gateway control plane in the embodiments shown in FIG. 6 to FIG. 8, and details are not repeated herein.

Optionally, as an embodiment, the sending unit 1501 is specifically configured to send a charging policy to the gateway forwarding plane, where the charging policy includes the indication identification set.

In the embodiment of the present invention, through an indication identification, a gateway forwarding plane and a gateway control plane may save or not save some charging information when a failure occurs to a link between the gateway forwarding plane and the gateway control plane. In this way, charging flexibility is improved.

Figure 16:
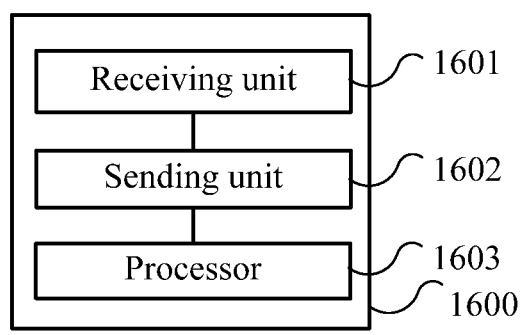
FIG. 16 is a structural block diagram of a gateway forwarding plane according to another embodiment of the present invention.

FIG. 16 is a structural block diagram of a gateway forwarding plane according to another embodiment of the present invention. A gateway forwarding plane 1600 shown in FIG. 16 includes a receiving unit 1601, a sending unit 1602, and a processor 1603.

The receiving unit 1601 is configured to receive an indication identification set sent by a gateway control plane.

The sending unit 1602 is configured to send fourth charging information to the gateway control plane, where the fourth charging information carries an indication identification, and the indication identification is an element in the indication identification set received by the receiving unit.

The processor 1603 is configured to, when it is detected that a failure occurs to a link to the gateway control plane, determine, according to the indication identification set received by the receiving unit 1601, whether fifth charging information collected in a stage where the failure occurs to the link to the gateway control plane needs to be saved.

The gateway forwarding plane 1600 may implement operations related to the gateway forwarding plane in the embodiments shown in FIG. 6 to FIG. 8, and details are not repeated herein.

Optionally, as an embodiment, the receiving unit 1601 is specifically configured to receive a charging policy sent by the gateway control plane, where the charging policy includes the indication identification set.

In the embodiment of the present invention, through an indication identification, a gateway forwarding plane and a gateway control plane may save or not save some charging information when a failure occurs to a link between the gateway forwarding plane and the gateway control plane. In this way, charging flexibility is improved.

Figure 17:
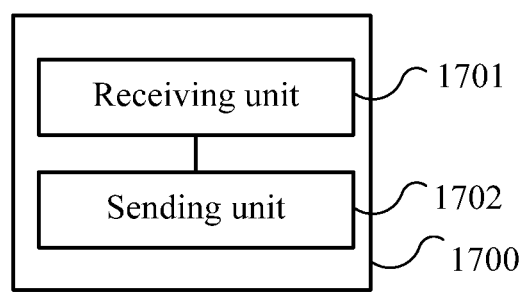
FIG. 17 is a structural block diagram of a charging gateway according to an embodiment of the present invention.

FIG. 17 is a structural block diagram of a charging gateway according to an embodiment of the present invention. A charging gateway 1700 shown in FIG. 17 includes a receiving unit 1701 and a sending unit 1702.

The receiving unit 1701 is configured to receive a first charging bill sent by a first gateway.

The sending unit 1702 is configured to send a fourth message to the first gateway, where the fourth message is used for instructing the first gateway to save a second charging bill or is used for instructing the first gateway to delay sending the second charging bill.

The charging gateway 1700 may implement operations related to the charging gateway in the embodiments in FIG. 9 to FIG. 11, and details are not repeated herein.

Optionally, as an embodiment, the sending unit 1702 is further configured to send a fifth message to the first gateway, where the fifth message is used for instructing the first gateway to send the second charging bill. The receiving unit 1701 is further configured to receive the second charging bill sent by the first gateway.

Therefore, in the embodiment of the present invention, a charging gateway instructs a first gateway to save a charging bill or delay sending a charging bill, and when a failure occurs to a link between the first gateway and the charging gateway, the first gateway saves the charging bill in time, so that no loss of the charging bill is caused. In this way, a disaster recovery capability of a system is improved.

Figure 18:
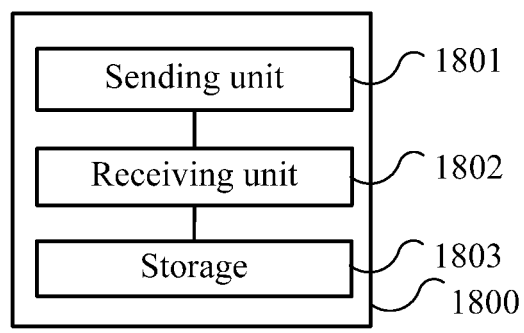
FIG. 18 is a structural block diagram of a first gateway according to another embodiment of the present invention.

FIG. 18 is a structural block diagram of a first gateway according to another embodiment of the present invention. A first gateway 1800 shown in FIG. 18 includes a sending unit 1801, a receiving unit 1802, and a storage 1803.

The first gateway may include a packet data network gateway (P-GW), a packet data serving node (PDSN), a Worldwide Interoperability for Microwave Access (WiMAX) Access Serving Network (WASN), or a UGW-C, and it should be understood that the foregoing is not limited in the present invention.

The sending unit 1801 is configured to send a first charging bill to a charging gateway.

The receiving unit 1802 is configured to receive a fourth message sent by the charging gateway.

The storage 1803 is configured to save a second charging bill according to the fourth message received by the receiving unit or delay sending a second charging bill according to the fourth message.

The first gateway 1800 may implement operations related to the first gateway in the embodiments in FIG. 9 to FIG. 11, and details are not repeated herein.

Optionally, as an embodiment, the receiving unit 1802 is further configured to receive a fifth message sent by the charging gateway. The sending unit 1801 is further configured to send the second charging bill to the charging gateway according to the fifth message received by the receiving unit.

Therefore, in the embodiment of the present invention, a charging gateway instructs a first gateway to save a charging bill or delay sending a charging bill, and when a failure occurs to a link between the first gateway and the charging gateway, the first gateway saves the charging bill in time, so that no loss of the charging bill is caused. In this way, a disaster recovery capability of a system is improved.

It can be clearly understood by persons skilled in the art that, for the purpose of convenient and brief description, for a detailed working process of the foregoing system, apparatus and unit, reference may be made to the corresponding process in the method embodiments, and details are not repeated herein.

In several embodiments provided in the present application, it should be understood that the disclosed system, apparatus, and method may be implemented in other manners. For example, the apparatus embodiments described in the foregoing are only exemplary. For example, the unit division is only logical function division and may be other division in actual implementation. For example, multiple units or components may be combined or integrated into another system, or some features may be ignored or not performed. In addition, the shown or discussed coupling or direct coupling or communication connection may be accomplished through some interfaces, and indirect coupling or communication connection between apparatuses or units may be electrical, mechanical, or in other forms.

Units described as separate components may be or may not be physically separated. Components shown as units may be or may not be physical units, that is, may be located in one place, or may also be distributed to multiple network units. Some or all of the units may be selected to achieve the objective of the solutions of the embodiments according to an actual demand.

In addition, various functional units in each embodiment of the present invention may be integrated in one processing unit or may exist as various separate physical units, or two or more units may also be integrated in one unit.

What is claimed is:

1. A charging information processing method, comprising:
   sending, by a gateway control plane to a gateway forwarding plane, a charging information identification set used for identifying charging information;
   saving, by the gateway control plane, first charging information sent by the gateway forwarding plane, wherein the first charging information carries a first charging information identification, and the first charging information identification is an element in the charging information identification set;
   receiving, by the gateway control plane, second charging information sent by the gateway forwarding plane and saved by the gateway forwarding plane, wherein the second charging information carries a second charging information identification, and the second charging information identification is an element in the charging information identification set; and
   combining, by the gateway control plane, the first charging information and the second charging information according to the first charging information identification and the second charging information identification;
   wherein saving the first charging information comprises saving the first charging information when it is detected that a failure occurs to a link to the gateway forwarding plane, and wherein receiving the second charging information comprises receiving the second charging information when it is detected that the link to the gateway forwarding plane is recovered.

2. The method according to claim 1, wherein, before receiving the second charging information sent by the gateway forwarding plane and saved by the gateway forwarding plane, the method further comprises sending a first message to the gateway forwarding plane, wherein the first message is used for instructing the gateway forwarding plane to send the second charging information.

3. The method according to claim 1, further comprising determining whether the first charging information and the second charging information are successfully combined, wherein the method further comprises:
   in response to a determination that the first charging information and the second charging information are successfully combined, generating a charging bill; and
   in response to a determination that the first charging information and the second charging information are not successfully combined:
      recording that the charging information is lost; or
      sending a request message to the gateway forwarding plane, wherein the request message comprises the first charging information identification, and wherein the gateway forwarding plane searches, according to the request message, for third charging information matching with the first charging information.

4. The method according to claim 3, further comprising determining whether the gateway forwarding plane finds the third charging information, wherein:
   in response to a determination that the gateway forwarding plane found the third charging information, the method further comprises:
      receiving the third charging information sent by the gateway forwarding plane, wherein the third charging information carries a third charging information identification, and the third charging information identification is an element in the charging information identification set; and
      combining the first charging information and the third charging information according to the first charging information identification and the third charging information identification; and
   in response to a determination that the gateway forwarding plane did not find the third charging information, the method further comprises receiving a second message sent by the gateway forwarding plane, wherein the second message is used for indicating that the charging information is lost.

5. A charging information processing method, comprising:
   receiving, by a gateway forwarding plane, a charging information identification set sent by a gateway control plane and used for identifying charging information;
   sending, by the gateway forwarding plane, first charging information to the gateway control plane, wherein the first charging information carries a first charging information identification, and the first charging information identification is an element in the charging information identification set;
   saving second charging information;
   sending, by the gateway forwarding plane, the second charging information to the gateway control plane, wherein the second charging information carries a second charging information identification, and the second charging information identification is an element in the charging information identification set; and
   combining, by the gateway control plane, the first charging information and the second charging information according to the first charging information identification and the second charging information identification;
   wherein saving the second charging information comprises saving the second charging information when it is detected that a failure occurs to a link to the gateway control plane, and sending the second charging information to the gateway control plane comprises sending the second charging information to the gateway control plane when it is detected that the link to the gateway control plane is recovered.

6. The method according to claim 5, wherein, after saving the second charging information, the method further comprises receiving, by the gateway forwarding plane, a first message sent by the gateway control plane, wherein sending the second charging information to the gateway control plane comprises sending the second charging information to the gateway control plane according to the first message.

7. The method according to claim 5, further comprising:
receiving, by the gateway forwarding plane, a request message sent by the gateway control plane, wherein the request message comprises the first charging information identification; and
searching, by the gateway forwarding plane according to the request message, for third charging information matching with the first charging information.

8. The method according to claim 7, further comprising determining, by the gateway forwarding plane, whether the third charging information is found, wherein:
in response to a determination that the third charging information is found, the method further comprises:
sending, by the gateway forwarding plane, the third charging information to the gateway control plane, wherein the third charging information carries a third charging information identification, and the third charging information identification is an element in the charging information identification set; and
combining, by the gateway control plane, the first charging information and the third charging information according to the first charging information identification and the third charging information identification; and
in response to a determination that the third charging information is not found, the method further comprises sending, by the gateway forwarding plane, a second message to the gateway control plane, wherein the second message is used for indicating that the charging information is lost.

9. A gateway control plane, comprising:
a transmitter configured to send, to a gateway forwarding plane, a charging information identification set used for identifying charging information;
a storage device, configured to save first charging information sent by the gateway forwarding plane, wherein the first charging information carries a first charging information identification, and the first charging information identification is an element in the charging information identification set;
a receiver, configured to receive second charging information sent by the gateway forwarding plane and saved by the gateway forwarding plane, wherein the second charging information carries a second charging information identification, and the second charging information identification is an element in the charging information identification set; and
a processor, configured to combine, according to the first charging information identification and the second charging information identification, the first charging information saved by the storage device and the second charging information received by the receive;
wherein the storage device is further configured to save the first charging information when it is detected that a failure occurs to a link to the gateway forwarding plane, and wherein the receiver is further configured to receive the second charging information when it is detected that the link to the gateway forwarding plane is recovered.

10. The gateway control plane according to claim 9, wherein the transmitter is further configured to send a first message to the gateway forwarding plane, wherein the first message is used for instructing the gateway forwarding plane to send the second charging information.

11. The gateway control plane according to claim 9, wherein the processor is further configured to determine whether the first charging information and the second charging information are successfully combined, wherein:
in response to a determination that the first charging information and the second charging information are successfully combined, the processor is further configured to generate a charging bill; and
in response to a determination that the first charging information and the second charging information are not successfully combined:
the processor is further configured to record that the charging information is lost; or
the transmitter is further configured to send a request message to the gateway forwarding plane, wherein the request message comprises the first charging information identification, and wherein the gateway forwarding plane is configured to search, according to the request message, for third charging information matching with the first charging information.

12. The gateway control plane according to claim 11, wherein:
in response to a determination that the gateway forwarding plane finds the third charging information, the receiver is further configured to receive the third charging information sent by the gateway forwarding plane, wherein the third charging information carries a third charging information identification, and the third charging information identification is an element in the charging information identification set, and the processor is further configured to combine the first charging information and the third charging information according to the first charging information identification and the third charging information identification; and
in response to a determination that the gateway forwarding plane does not find the third charging information, the receiver is further configured to receive a second message sent by the gateway forwarding plane, wherein the second message is used for indicating that the charging information is lost.

13. A gateway forwarding plane, comprising:
a receiver, configured to receive a charging information identification set sent by a gateway control plane and used for identifying charging information, wherein the receiver is further configured to send the charging information identification set to a transmitter;
the transmitter, configured to send first charging information to the gateway control plane, wherein the first charging information carries a first charging information identification, and the first charging information identification is an element in the charging information identification set; and
a storage device, configured to save second charging information;
wherein the transmitter is further configured to send the second charging information saved by the storage device to the gateway control plane, wherein the second charging information carries a second charging information identification, and the second charging information identification is an element in the charging information identification set, wherein the gateway control plane is configured to combine, according to the first charging information identification and the second charging information identification, the first charging information and the second charging information; and
wherein the storage device is further configured to save the second charging information when it is detected that a failure occurs to a link to the gateway control plane, and to send the second charging information to the gateway control plane when it is detected that the link to the gateway control plane is recovered.

14. The gateway forwarding plane according to claim 13, wherein the receiver is further configured to receive a second message sent by the gateway control plane, and wherein the transmitter is further configured to send the second charging information to the gateway control plane according to the second message received by the receiver.

15. The gateway forwarding plane according to claim 13, wherein the receiver is further configured to receive a request message sent by the gateway control plane, wherein the request message comprises the first charging information identification, and wherein the gateway forwarding plane further comprises a processor, wherein the processor is configured to search, according to the request message, for third charging information matching with the first charging information.

16. The gateway forwarding plane according to claim 15, wherein:

when the processor finds the third charging information:
   the processor is further configured to send the third charging information to the transmitter;
   the transmitter is further configured to send the third charging information to the gateway control plane, wherein the third charging information carries a third charging information identification, and the third charging information identification is an element in the charging information identification set; and
   the processor is further configured to combine the first charging information and the third charging information according to the first charging information identification and the third charging information identification; and when the processor does not find the third charging information, the transmitter is further configured to send a third message to the gateway control plane, wherein the third message is used for indicating that the charging information is lost.

* * * * *